United States Patent [19]

Wear

[11] 4,121,084
[45] Oct. 17, 1978

[54] METHOD AND APPARATUS FOR WELDING WORKPIECES

[75] Inventor: Charles W. Wear, Gretna, Nebr.

[73] Assignee: The Youngstown Steel Door Company, Cleveland, Ohio

[21] Appl. No.: 658,716

[22] Filed: Feb. 17, 1976

[51] Int. Cl.$^2$ .............................................. B23K 9/00
[52] U.S. Cl. .................... 219/91.2; 219/74; 219/91.1; 219/125.1; 219/137 R
[58] Field of Search ............... 219/72, 74, 75, 87, 219/89, 92, 124, 125 R, 125 PL, 127, 137 R, 91.1, 91.2, 125.1, 124.1; 228/45

[56] References Cited

U.S. PATENT DOCUMENTS

| | | | |
|---|---|---|---|
| 2,293,535 | 8/1942 | Doll et al. | 219/87 |
| 3,043,945 | 7/1962 | Reis | 219/127 |
| 3,062,950 | 11/1962 | Chyle | 219/127 |
| 3,678,241 | 7/1972 | Erlandson et al. | 219/72 |
| 3,778,583 | 12/1973 | Becker | 219/92 X |
| 3,925,635 | 12/1975 | Schneider | 219/89 |

Primary Examiner—J. V. Truhe
Assistant Examiner—Clifford C. Shaw
Attorney, Agent, or Firm—John H. Mulholland

[57] ABSTRACT

A method and apparatus for welding workpieces wherein the workpieces are defined by a structure having a plurality of areas with joined and bonded locations with at least one of the areas being different in depth than the depth of its adjacent area. At least one group of welding heads is provided in a predetermined spacial arrangement. When the welding heads are activated, they operate to join and bond the workpieces at certain joined and bonded locations. A carriage is provided to move the workpieces under the welding heads. Limit switches and a control circuit are provided for stopping the workpieces under the welding heads so that a first zone on the workpieces, which includes portions of more than one of the areas of different depths are under the welding heads. Means are also provided for lowering the welding heads until they come into contact with and exert pressure on the workpieces adjacent the location to be welded in the areas different in depth in the first zone. The apparatus can be set for lowering only certain predetermined welding heads. The heads exert pressure on the workpieces adjacent to the locations to be welded in the areas different in depth in the first zone. A flow of shielding gas is provided in the locations to be welded. The welding heads are activated to weld the workpieces at the locations to be welded in the first zone. The apparatus also includes welding wire for feeding towards the locations to be welded and a power supply and arc igniting current, so that a welding arc is ignited between the workpieces and the welding wire. Upon completion of the welding process in the first zone, the welding heads are lifted. The workpieces are sequentially advanced so that all the zones to be welded are stopped for a welding operation under the welding heads.

2 Claims, 16 Drawing Figures

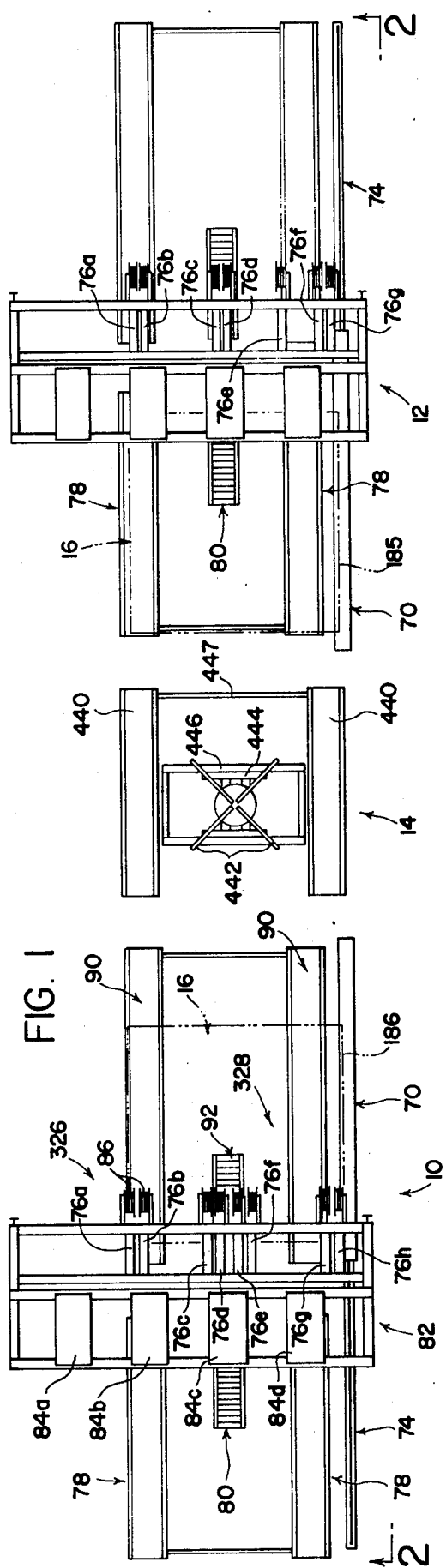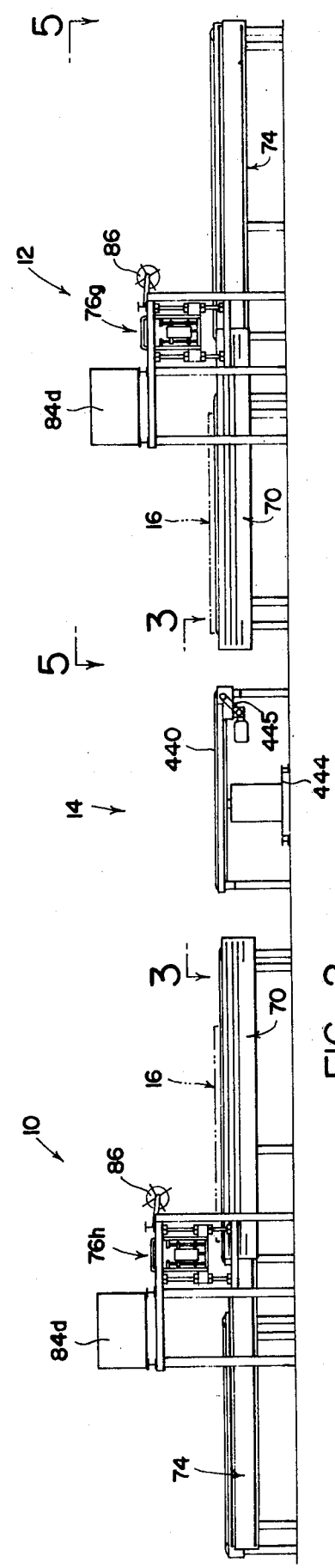

METHOD AND APPARATUS FOR WELDING WORKPIECES

BACKGROUND OF THE PRESENT INVENTION

The present invention relates to a method and apparatus for welding workpieces together and particularly relates to a method and apparatus for welding workpieces together to provide a structure having a plurality of areas with joined and bonded locations at least one of which areas are different in depth than the depth of one of its adjacent areas.

The design of certain products require that a plurality of workpieces be joined together to provide a particular structure. Dependent on the geometric configuration of such a structure, it is necessary that certain locations be joined and bonded at different depths. One such structure of the workpieces is a railway car door.

Railway car doors are constructed of various panels, panel members, angle members, door frame members, plates, gasket retainers, hat shape members, etc. In the past, these railway car door components have been joined together with rivets. Due to the geometric configuration of these components required by various operational and strengthening construction features and such other desirable features known to those in the art, the location of the areas of the parts to be joined are at different depths.

In the past, such joining has been performed by the use of rivets. A railway car door of the riveted construction has presented certain problems in its construction. One such problem is that when the parts are riveted together, a multiple assembly process must be followed which requires the perforation of the parts to be joined and the alignment of those perforations, which may necessitate reaming the perforations to assure alignment of the parts. Rivets are then positioned in the perforations and the rivets are then headed to assemble the parts together. This multiple step process of assembling the parts of a railway car door is indeed complicated, time consuming and, as a result, expensive.

The placement of rivets is important since gapping between two of the door members along their edge is created if the rivets are placed too close to each other or the members are not properly aligned. This effect is commonly referred to as "gapping" or "scalloping." In addition, a door constructed by utilizing the riveting process must of necessity have protruding heads which, in some cases, limits the design construction and clearance of the railway car door. Due to the newly enacted Federal Occupational Health and Safety Act requirements, riveting generally creates a high noise level in the assembly location and thereby does not provide a desirable environment for the assembly personnel. An additional problem associated with a riveted railway car door is that when such a door is damaged, an extensive number of steps must be followed to repair the car door parts and re-rivet the damaged parts together so that the door is again operational.

The present invention solves these prior art problems by the use of gas metal arc welding. The gas metal arc welding process maintains an electric arc between a continuously fed electrode welding wire and the workpieces. Shielding is necessary as in any welding process to exclude oxygen and nitrogen in the air from the arc and the metal, thus eliminating the formation of oxides and nitrides which decrease metal-weld ductility and sometimes strength. In the gas metal arc process, shielding is accomplished by the flow of a shielding gas from a welding head which protects and shields the welding zone. After the shielding gas begins to flow, the welding wire is fed toward the workpieces which are assembled in their respective positions in which they are to be joined. The welding power is supplied between the workpieces and the welding wire to thereby strike an arc therebetween. As the welding wire continues to move towards the workpieces, an opening is burned into the workpieces which is subsequently filled with molten metal melted by the arc. The shielding gases protect the melting electrode wire and the welded metal from the air. After the weld is allowed to cool, it is no longer necessary to provide the shielding gas in the welding zone.

One known machine for joining and securing metal parts together is disclosed in U.S. Pat. No. 2,466,668 to Weightman. Weightman discloses an electrical resistance or spot welding machine which resistance welds a plurality of elongated profiles along their length to form a beam. Another prior art resistance welding device is disclosed by U.S. Pat. No. 2,464,906 to Unger. Unger discloses a resistance welding machine for resistance welding corrugated stiffeners to side sheets. The resistance weld is made in the troughs of the corrugated stiffeners to join the corrugated stiffeners and side sheets together into a panel.

In the past, the resistance spot welding process to assemble railway car door parts has been tried, as shown in U.S. Pat. No. 1,240,634 to Williams but modern assembly of railway car door components utilize a riveting process. It should be noted that the spot welding process has inherent problems as described below.

One of the inherent problems in the resistance welding process is obtaining a high quality welded joint. In order to obtain a proper resistance welded joint, it is necessary that the surfaces of the material to be joined are clean and do not have any scale, dirt or plating thereon which affect the resistance welding process. Such a cleaning process inherently increases the number of steps and costs involved in resistance welding workpieces together. Even after the cleaning process, it is possible that some scale, dirt or plating can subsequently contaminate the area to be joined or some scale, dirt or plating may remain in the area to be joined. The parts must also be degreased before performing the resistance welding process.

Another problem associated with the automation of the resistance welding process is that when multiple resistance welding heads are brought into contact with the workpieces, each of the welding heads must weld simultaneously or the welding heads must be well insulated from each other. This inherent problem creates difficulty in designing a machine where the welding heads are selectively fired dependent on the position of the welding head with respect to the workpieces.

Another known apparatus for welding workpieces together includes a plurality of gas metal arc welding heads which are movable toward and away from the workpieces to be joined together. This apparatus of the prior art does not provide for welding workpieces together when the locations to be welded are at different depths or independent control of the welding heads for selective firing thereof.

The above-mentioned apparatus of the prior art for welding workpieces together includes a plurality of gas metal arc welding heads which are moved in unison toward and away from the workpieces to be joined together. This prior art apparatus is capable of welding workpieces together so long as the locations to be welded together are of the same depth.

SUMMARY OF THE INVENTION

The present invention provides a method and apparatus for welding workpieces together to provide a structure having a plurality of areas with joined and bonded locations wherein at least one of the areas to be joined and bonded are different in depth than one of the adjacent areas. At least one group of welding heads is provided in a predetermined spacial arrangement which, when activated, serve to join and bond workpieces at certain locations. Means are provided for moving the workpieces under the welding heads and means are also provided for stopping the workpieces under the welding heads at a position of orientation so that a first zone on the workpieces, which includes portions of more than one of the areas at different depth, are under the welding heads.

In order to move the welding heads into a welding position, means are provided for lowering the welding heads until they come into contact with and exert pressure on the workpieces adjacent the locations to be welded in the areas different in depth. It should be understood that the means for lowering the welding heads includes means for lowering only certain predetermined welding heads so that welds may occur in the locations only as determined.

To begin the welding process, the method and apparatus of the present invention provides a flow of shielding gas in the locations to be welded and means are provided for activating the welding heads to weld the workpieces at the locations to be welded. Means for feeding welding wire towards the locations moves an electrode welding wire toward the workpieces and means for activating the power supply is started. When the welding wire is in the proper position with respect to the workpieces, a welding arc is ignited in the atmosphere of shielding gas. The electrode welding wire continues to feed into the area to be welded and upon completion of the weld, stops and burns back. After the weld has sufficiently cooled, the flow of the shielding gas is stopped and the welding heads are lifted.

As described above, the present invention method and apparatus is capable of simultaneously welding workpieces together where the weld locations are different in depth. The apparatus of the present invention is also capable of selectively firing the welding heads so that if it is not desirable for one of the welding heads to be fired, it will not be fired and welding is not performed at that particular location. The apparatus of the present invention is also capable of independent control of the movement of the welding heads so that if it not desirable for one of the welding heads to move down at a particular location on the workpieces to be welded, the welding head will be so controlled. This feature of the present invention allows for great flexibility in the design of the workpieces to be welded by the apparatus of the present invention.

The apparatus of the present invention also provides a material handling system which is capable of welding components comprising large workpieces or panels together and thereby minimizes difficult handling and positioning problems that would result from the large size of these workpieces. In addition, the gas metal arc welding process utilized by the present invention does not require any special preparation of the workpieces prior to welding and that the scale, dirt or plating on the workpieces need not be removed or a degreasing or cleaning process need be performed prior to assembling and welding the workpieces. In addition, the apparatus of the present invention is also desirable since the noise level of operation is much less than that of other assembly processes.

The product produced by the method and apparatus of the present invention may have a complex geometric configuration and when produced by the method and apparatus of the present invention, is particularly desirable from many aspects. For example, a railway car door has a complex geometric configuration with various components which are joined together at various depths as described hereinabove. By being able to assemble the railway car door by the gas metal arc welding process, all of the multiple steps required in riveting are eliminated. In addition, scalloping or gapping is not created when the components of a railway car door are assembled with the apparatus of the present invention.

As hereinabove described, when railway car door components are assembled by the riveting process, there is scalloping or gapping between the components along the edge of the door, and the spacing of the rivets is dictated by the amount of scalloping or gapping allowable. The railway car door assembled by the apparatus of the present invention minimizes scalloping or gapping and therefore no greater number of welds need be placed than are necessary. Thus, greater flexibility is allowed in the spacing of the welds.

A railway car door assembled by the apparatus of the present invention also provides the advantageous features of having a flush surface without any protruding heads which are created by the riveting process. In addition, the welded joints of such a railway car door are at least as strong as the riveted construction. In addition, when a railway car door assembled by the apparatus of the present invention is damaged, it may be simply rewelded to thereby minimize the repair of such a damaged door.

It is an object of the present invention to provide a method and apparatus for welding workpieces together which workpieces have a structure having a plurality of areas with joined and bonded locations with at least one of the areas being different in depth than the depth of the adjacent area.

It is yet another object of the present invention to provide a method and apparatus for welding workpieces together in which a group of welding heads are provided in a predetermined spacial arrangement and which is capable of selective firing of these welding heads.

It is yet another object of the present invention to provide a method and apparatus for welding workpieces together which provides for at least one group of welding heads whose movement into and out of welding engagement with the workpieces is independently controlled.

It is yet another object of the present invention to provide a method and apparatus for welding workpieces together which includes a material handling system to minimize the handling and positioning of the workpieces as they are joined and bonded together.

It is yet another object of the present invention to provide a method and apparatus for welding workpieces together which eliminates the requirement for preparation of the surfaces to be welded prior to welding.

It is a further object of the present invention to provide a method and apparatus for welding workpieces together in which the operational noise level is minimized.

It is a further object of the present invention to provide a method and apparatus for welding workpieces together which is capable of accommodating workpieces of complex and varying geometric configurations.

It is yet another object of the present invention to provide a method and apparatus for welding workpieces together having complex geometric configurations which minimizes the gapping or scalloping between the adjacent workpieces.

BRIEF DESCRIPTION OF THE DRAWINGS

FIG. 1 is a top elevational view of a first and a second apparatus for welding workpieces together with a turntable device interposed therebetween;

FIG. 2 is a side elevational view of the first and second apparatus for welding workpieces together with a turntable device interposed therebetween as shown in FIG. 1 and taken along line 2—2 thereof;

DETAILED DESCRIPTION OF THE INVENTION

Figure 3:
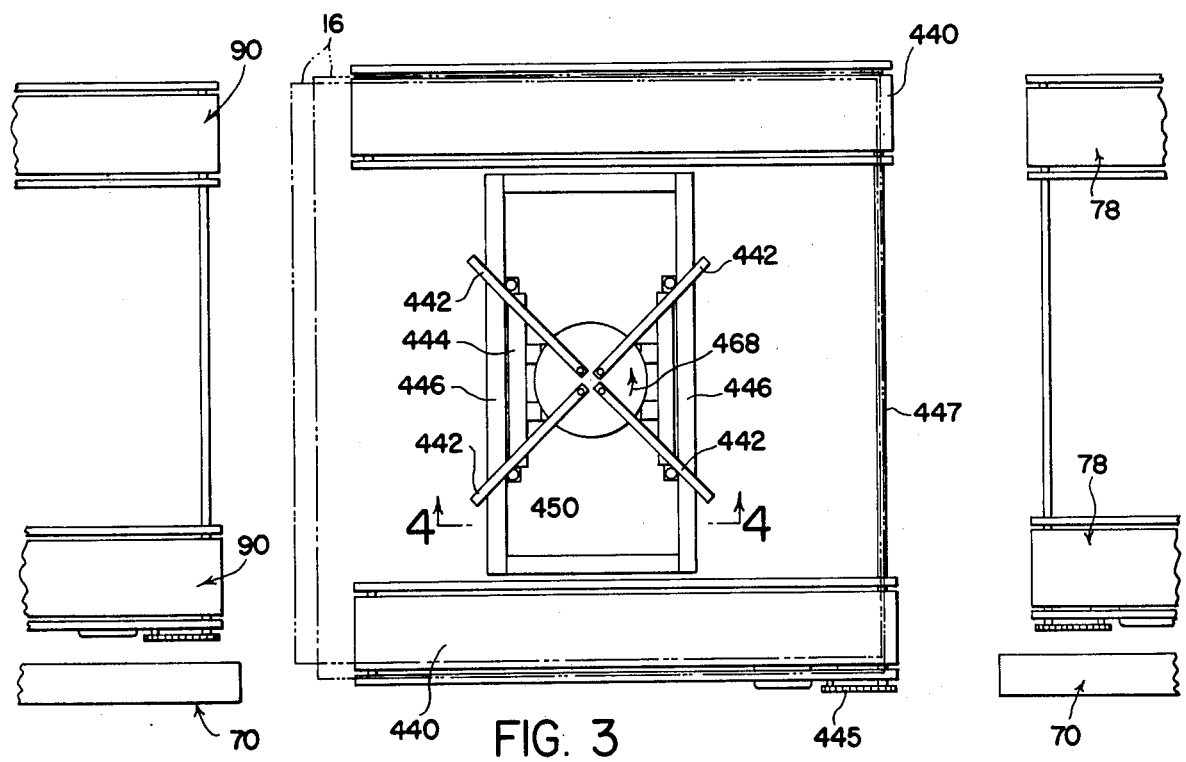
FIG. 3 is an enlarged top elevational view of the turntable device shown in FIG. 2 and taken along line 3—3 thereof.

The present invention provides a new and improved method and apparatus for joining workpieces together and is capable of joining these workpieces together when the locations of the workpieces to be joined are at different depths. A group of gas metal arc welding heads are provided to weld the parts together and are controllable so that they may be selectively fired. In addition, raising and lowering of the welding heads may be controlled to thereby allow the welding heads to "step over" various obstructions and geometric configurations of the workpieces which are being joined together. These features allow the joining of workpieces of a wide variety of geometric configurations.

The method and apparatus of the subject invention is particularly adaptable to welding railway car door components together. For purposes of description, the method and apparatus of the present invention will hereinafter be described in connection with the assembly of a railway car door. It should be understood that the other assemblies of varying geometric configurations and sizes may be assembled by the method and apparatus of the present invention. In addition, the present invention may be applied to apparatuses of a wide variety of constructions and designs and for purposes of illustration is described in the drawings as applied to the welding apparatuses 10 and 12 and turntable device 14 shown in FIG. 1.

The welding apparatuses 10 and 12 and turntable device 14 shown in FIGS. 1 and 2 cooperate to join the components of a railway car door, generally indicated at 16 in FIGS. 11, 12, 13 and 14. The railway car door 16 comprises a panel 18 with door framing members 20 and gasket retainers 22 generally located about the periphery of the panel 18. The door also includes a hat-shaped horizontal reinforcement member 24, a Z-shaped horizontal reinforcing member 26, a vertical reinforcing plate member 28 and a hat-shaped vertical reinforcing member 30.

Figure 13:
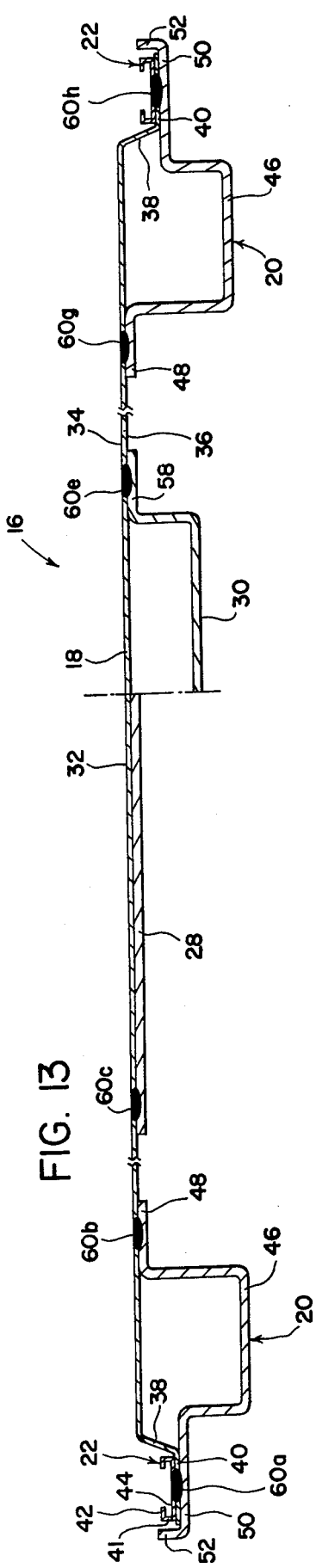
FIG. 13 is a sectional view of the railway car door shown in FIG. 11 and taken along line 13—13 thereof.
Figure 14:
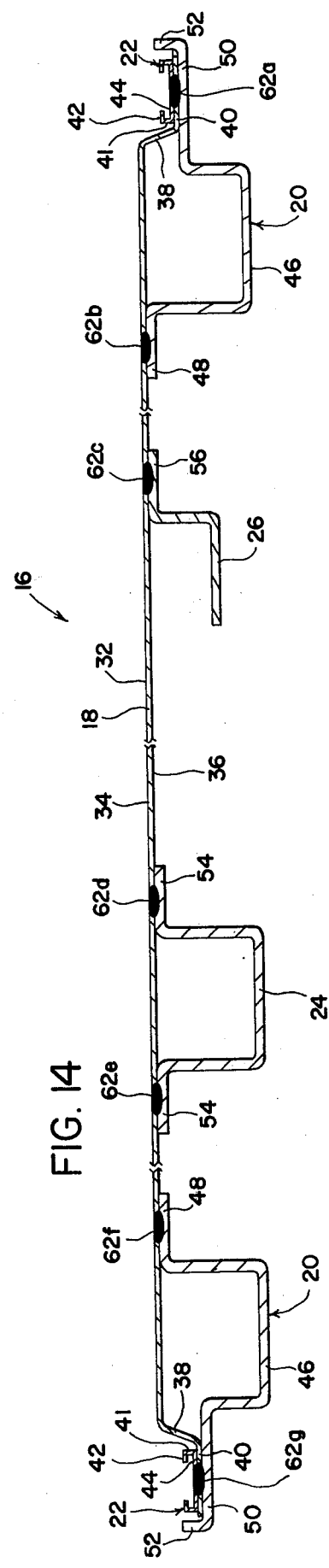
FIG. 14 is a sectional view of the railway car door shown in FIG. 11 and taken along line 14—14 thereof.

As seen in FIGS. 13 and 14, the door panel 18 has a central portion 32 defining an inner surface 34 which defines a portion of the inner surface of the railway car door 16 and an outer surface 36 which defines a portion of the outer surface of the railway car door 16. The central portion 32 of the panel 18 is generally rectangular in configuration and has an extending portion 38 extending laterally away from the periphery of the central portion 32 and terminating in an offset portion 40. The offset portion 40 is substantially parallel to the central portion 32 and displaced therefrom so that the offset portion 40 is at a different depth than the central portion 32.

Figure 11:
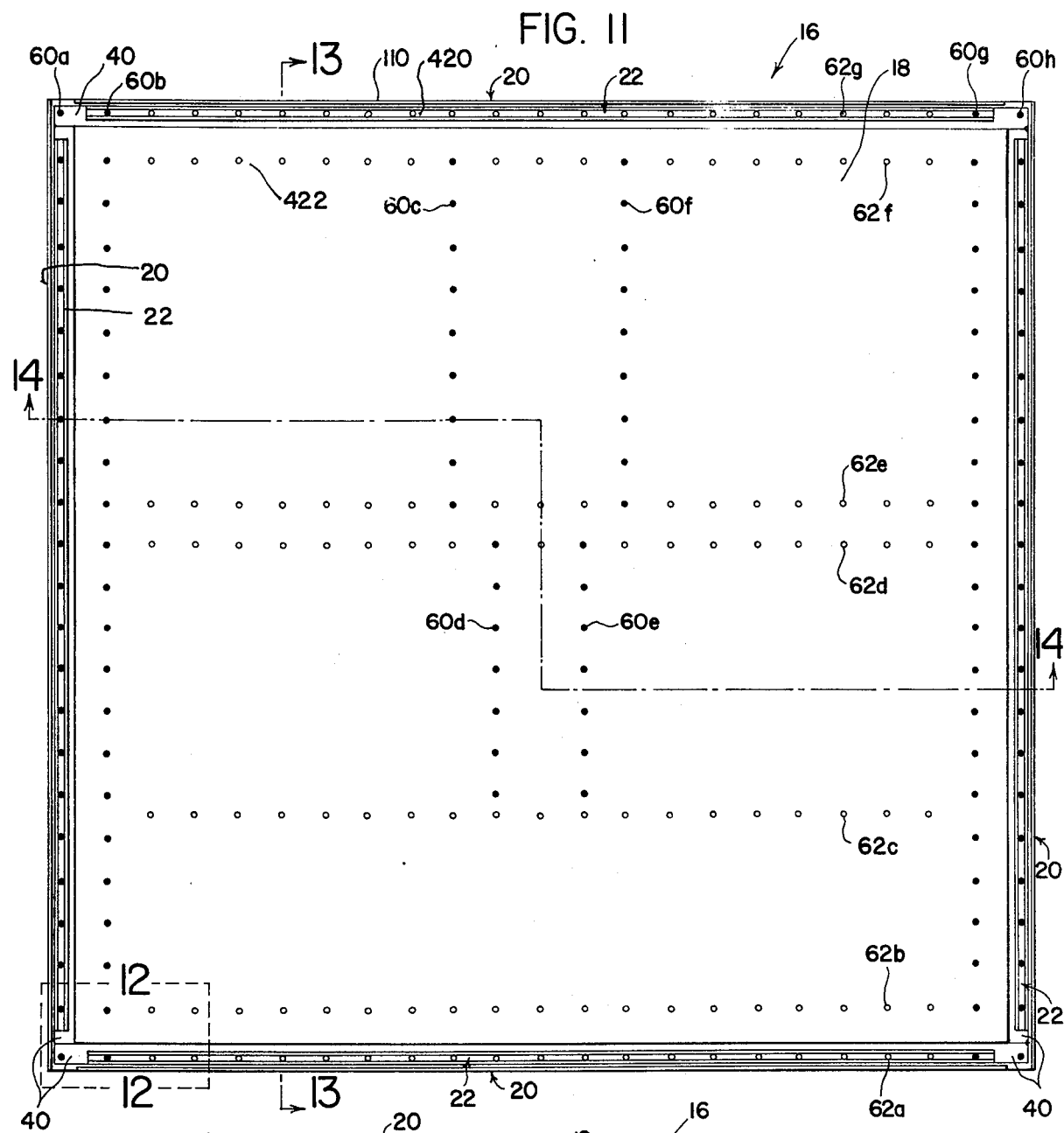
FIG. 11 is a top view of a railway car door to be welded by the apparatus shown in FIG. 1.

The offset portion 40 of the panel 18 extends about the entire periphery of the central portion 32 thereof so that a gasket may be affixed to the door 16 about its outer periphery. The gasket is provided to seal against the sealing surface on the railway car or seal against an adjacent door or railway car support member. In order to secure a gasket to the outer periphery of the door, the gasket retainer members 22 are secured to the offset portion 40 as shown in FIG. 11. The gasket retainers 22 have a central portion 44 with upwardly extending side portions 41 terminating in gasket retaining portions 42 as seen in FIGS. 13 and 14. The gasket is placed in the gasket retaining member 22 after assembly of the door 16 and is retained therein. Gasket retainer members 22 are secured to the offset portion 40 of the panel 18 by the method and apparatus hereinafter described.

To protect the outer peripheral edge of the door panel 18 and increase the rigidity and strength of the door 16, door framing members 20 are provided and are secured to the offset portion 40 and the central portion 32 of the panel 18. The door framing members 20 have a generally hat-shaped reinforcing portion 46 with a central securing portion 48 and an offset securing portion 50. The hat-shaped reinforcing portion 46 is formed so that when the panel 18 and the door framing members 20 are assembled, the central panel securing portion 48 rests against the outer surface 36 of the panel 18 and the offset securing portion 50 is adjacent to the offset portion 40 of the door panel 18. Accordingly, the central panel securing portion 48 and the offset securing portion 50 are at different depths with respect to each other as can be seen in FIGS. 13 and 14. The door framing members 20 also have a protective lip 52 extending from the offset securing portion 50 which when assembled with the panel 18 protect the outer peripheral edge thereof.

Extending horizontally across the door panel 18 is the hat-shaped horizontal reinforcing member 24 and the Z-shaped horizontal reinforcing member 26. The hat-shaped horizontal reinforcing member 24 has securing portions 54, as seen in FIG. 14, which are secured to the central portion 32 of the door panel 18 by welds performed by the apparatus of the present invention, as will be hereinafter more fully described. The Z-shaped horizontal reinforcing member 26 has a securing portion 56 which is secured to the central portion 32 of the door panel 18 by welding as will be hereinafter more fully described.

The door 16 includes a vertically extending reinforcing plate member 28 secured to the outer surface 36 of the central portion 32 of the panel 18, as shown in FIGS. 11 and 13 and extending throughout a portion of the vertical dimension of the door 16. The door 16 also includes a hat-shaped vertical reinforcing member 30 secured to the central portion 32 of the door panel 18 throughout another portion of the vertical dimension of the door 16. The hat-shaped vertical reinforcement member is generally hat-shaped in configuration and terminates in securing portions 58 as seen in FIG. 13 for securement by welds to the central portion 32 of the door panel 18.

It may be seen from the above description of the door 16 that the components thereof, when in an assembled position, must necessarily be joined and bonded at locations of different depths. For example, the joining location of the offset portion 40 of the panel 18 to the gasket retainers 22 and the offset securing portion 50 of the door framing members 20 is at a different depth than the depth of the locations to be joined which interconnect the central portion 32 of the panel 18 to the central panel securing portion 48 of the door framing members 20. Thus, certain areas of the workpieces are at different depths.

The above described railway car door 16 is provided for purposes of illustrating and describing the operation of the welding apparatuses 10 and 12 and turntable device 14 and the novel features in connection therewith. It should be understood that a wide variety of railway car doors and other assemblies may be joined and bonded together by the method and apparatus of the present invention.

The welding apparatus 10 is capable of joining the parts of the door 16 together with a series of gas metal arc spot welds with eight operational welding heads, as will hereinafter be described. The general operation of the welding apparatus provides for the mounting of the door components 16 on the welding apparatus 10 and sequentially moving the door 16 through the apparatus to join the parts of the door 16 together with a series of gas metal arc spot welds along eight lines, 60a through 60h, along one direction of door 16 shown in FIG. 11. The welds performed by the welding apparatus 10 are indicated schematically in FIG. 11 as solid black dots and as the door 16 is moved through the apparatus 10, gas metal arc spot welds are made in the locations indicated by the black dots. For example, when the door 16 is mounted in the welding apparatus 10 and moved to a first zone of welding positions, gas metal arc welds were performed along the first zone welding locations of the weld lines 60a, 60b, 60g and 60h. In the next welding position, welds are performed in the second zone of weld locations along the weld lines 60a, 60b, 60c, 60f, 60g and 60h. As the door 16 progressively moves through the machine, it can be seen from FIG. 11 that the next change in the welding locations will be that the welding heads will weld at positions 60a, 60b, 60d, 60g and 60h. As the door continues to move, the last series of welds made by the welding apparatus 10 will be along the locations on the weld lines 60a, 60b, 60g and 60h as will be further hereinafter more fully described.

When the welding operation is completed by the welding apparatus 10, the door 16 is moved onto the turntable 14 and rotated 90° and subsequently fed into the welding apparatus 12 for a second series of sequential gas metal arc spot welds.

The welding apparatus 12 has seven operational welding heads shown, as will be hereinafter further described. In the embodiment shown in FIG. 1, one of the welding heads normally present has been removed, but it should be understood that any welding head which is not necessary may be simply rendered inoperative. Thus, the welding apparatus 12 is capable of providing welds along welding locations on the door 16 shown in FIG. 11 and oriented along seven lines 62a through 62g which welding locations are indicated schematically in FIG. 11 as small circles. As the door 16 moves through the welding apparatus 12, the welds noted along the welding lines 62a through 62g are performed. Thus, when the door 16 passes through the welding apparatus 12, the components of the door 16 are joined and bonded together into a rigid structure.

Figure 12:
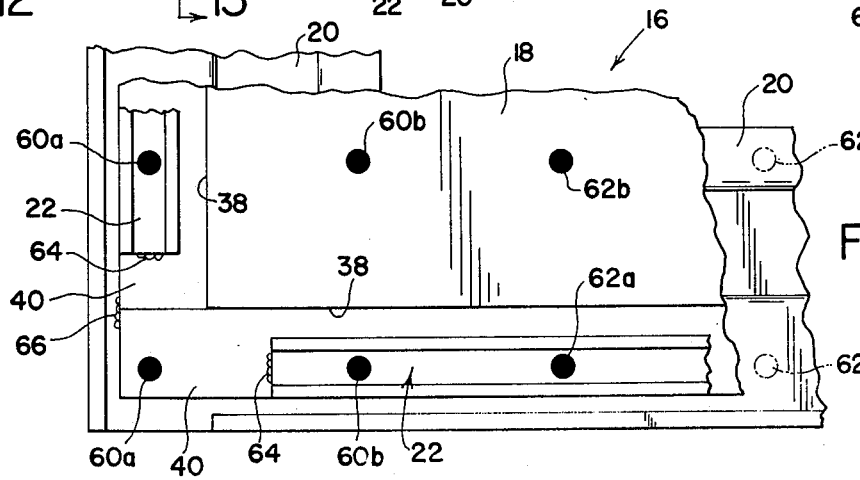
FIG. 12 is an enlarged view of the corner of the railway car door shown in FIG. 11 in the area enclosed by line 12—12 thereof.

As described hereinabove, since the gas metal arc welding process is used by the welding apparatuses 10 and 12 of the present invention, it is unnecessary to perform any cleaning or degreasing processes prior to assembly of the parts of the door 16. The parts 18, 20, 22, 24, 26, 28 and 30 of the door 16 are immediately assembled in a jig in their respective positions and secured in those positions by any conventional means such as clamps or spot "tack" welds. FIG. 12, for example, shows spot welds 64 for securing the gasket retainers 22 to the offset portions 40 of the panel 18 and a spot weld 66 for securing the door framing member 20 to the offset portion 40 of the panel 18. It should be understood the remainder of the parts of the door 16 are so secured and interconnected with each other so that they are retained in their respective positions while being permanently secured and joined with each other by the welding apparatuses 10 and 12 of the present invention.

Upon completion of such temporary assembly and securement of the door parts, they are placed on the welding apparatus 10 so that the upper edge 110 of the door assembly 16 shown in FIG. 11 is the leading edge closest to the welding heads of the welding apparatus 10.

Figure 5:
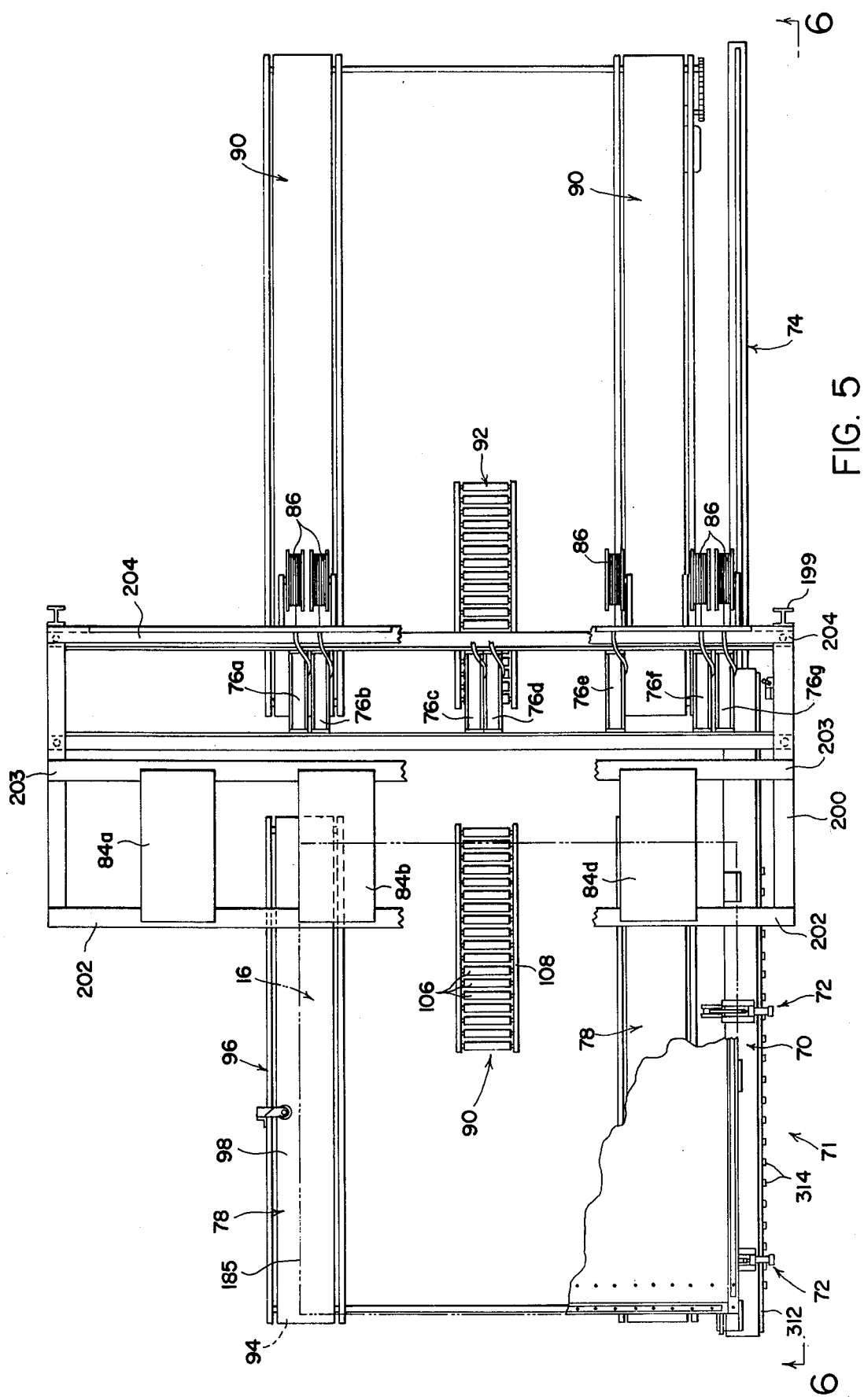
FIG. 5 is an enlarged top elevational view of the second welding apparatus shown in FIG. 2 and taken along line 5—5 thereof.
Figure 6:
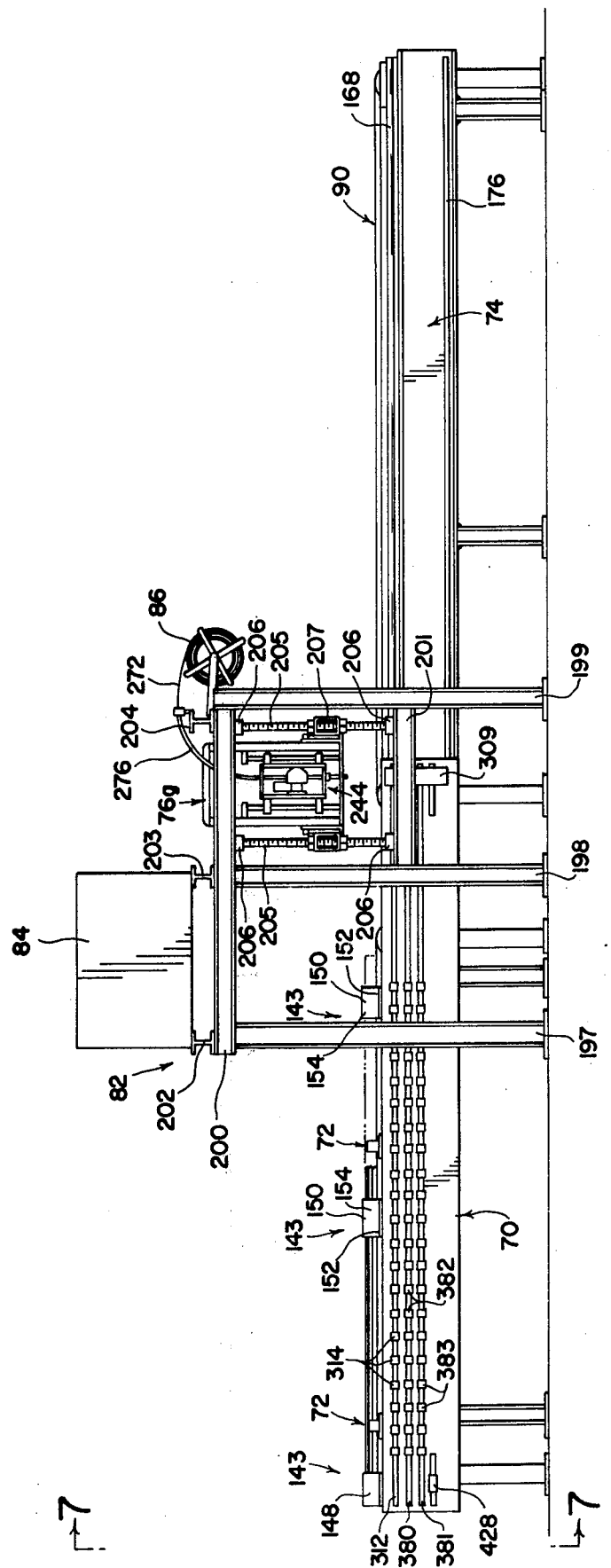
FIG. 6 is a side elevational view of the welding apparatus shown in FIG. 5 and taken along line 6—6 thereof.
Figure 7:
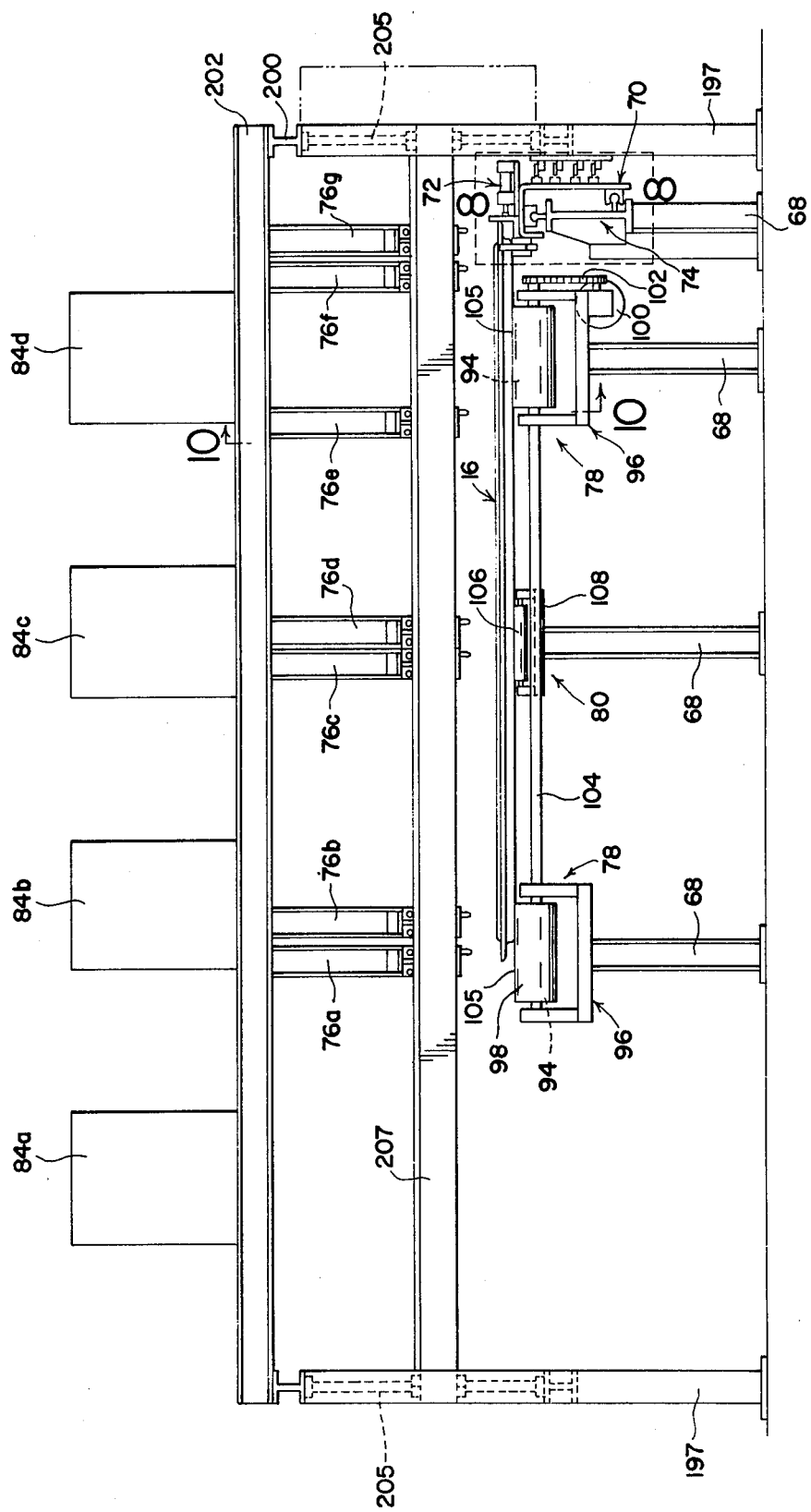
FIG. 7 is an end elevational view of the welding apparatus shown in FIG. 6 and taken along line 7—7 thereof.

It should be understood at this point that the welding apparatuses 10 and 12 are identical in construction and operational capabilities except that one of the welding heads has been removed from the welding apparatus 12 shown in FIG. 1. The welding units of the welding apparatus 10 are in different positions than the welding units of the welding apparatus 12, as will hereinafter be more fully described. Accordingly, common numerals will be used in describing the components of the welding apparatuses 10 and 12. FIGS. 5, 6 and 7 show the welding heads positioned as in the welding apparatus 12, but for ease of description, the components shown in these figures will be described in connection with the welding apparatuses 10 or 12 alternatively.

The welding apparatus of the present invention shown in FIG. 5, 6 and 7 include frame members 68 which support a stationary carriage guide generally indicated at 74 which supports a movable carriage 70. The movable carriage 70 has panel securing means 72, as indicated in FIG. 5, for securing the panel 16 to the movable carriage 70. Thus, after the components of the panel 16 are assembled in a jig, the assembly may be positioned on the carriage 70 and secured thereto by the door securing means 72. Means 73 for moving the workpieces under the welding heads, generally indicated at 96, includes the carriage 70. The carriage 70 is movable toward the welding units 76 and when so moved serve to move the door 16 toward the welding units 76 which are in a predetermined spacial arrangement. When the door 16 is loaded on the welding apparatus, it is also supported by a feeding power conveyor 78 supported by frame members 68 and a roller conveyor 80 supported by other frame members 68. The frame members 68 are secured to the floor on which the welding apparatus is positioned.

Figure 8:
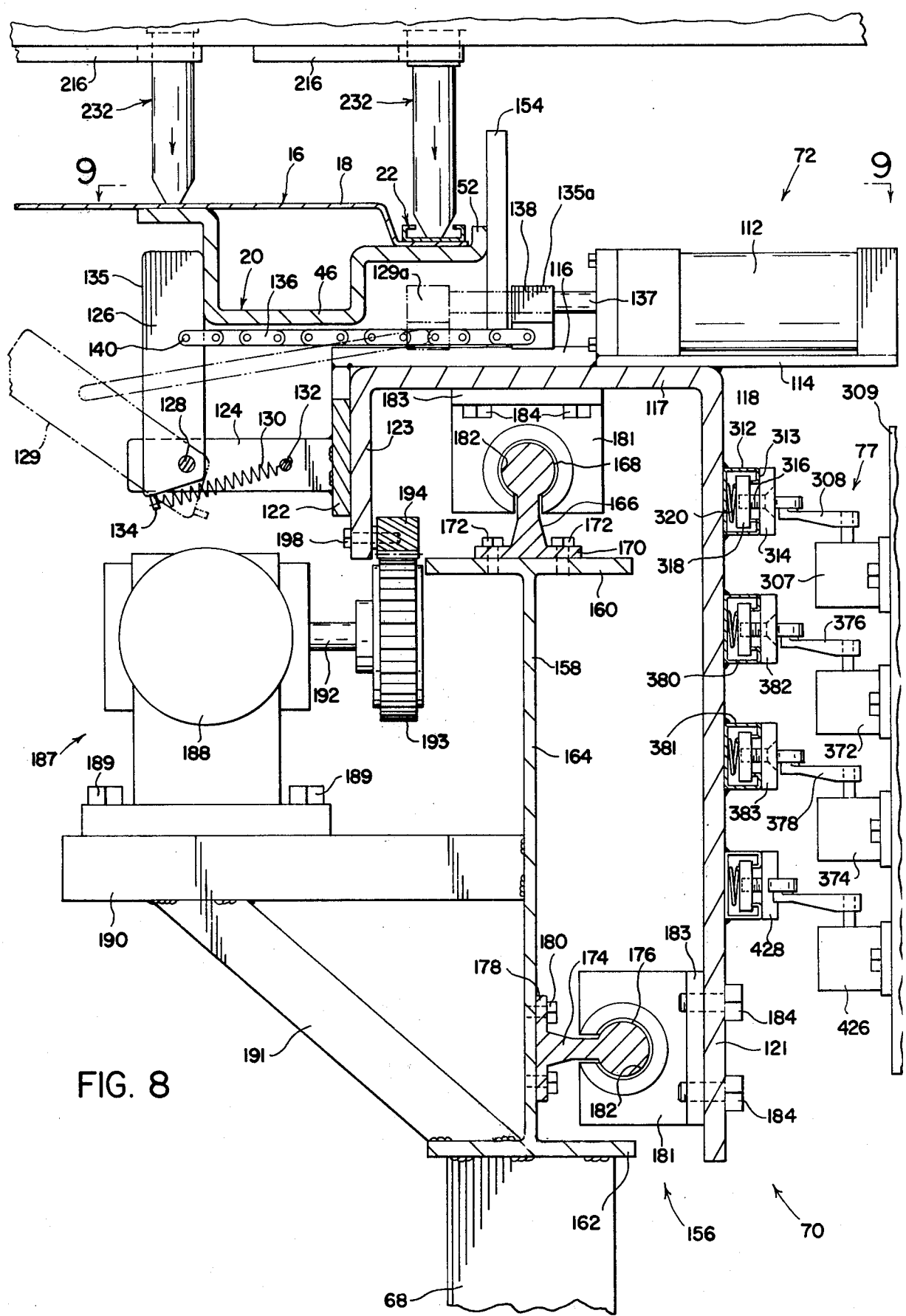
FIG. 8 is an enlarged view of the drive mechanism of the welding machine shown in FIG. 7 in the area enclosed by line 8—8 thereof.
Figure 10:
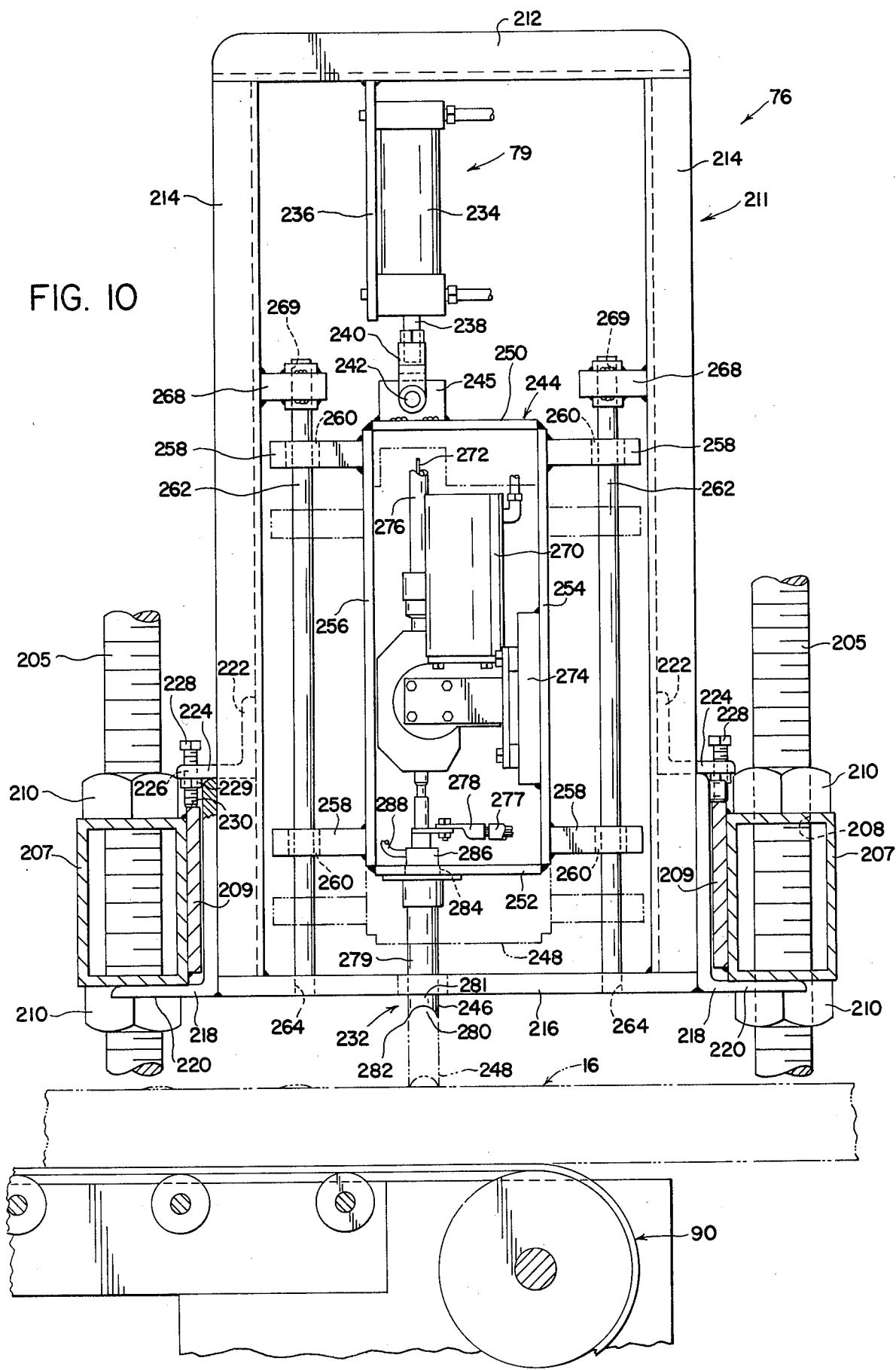
FIG. 10 is a side elevation view of one of the welding units of the welding apparatus shown in FIG. 7 and taken along lines 10—10 thereof.

After the door 16 is secured to the carriage 70, the door is moved forward towards the welding units 76. Means 77, indicated in FIG. 8, are provided for stopping the door 16 in a position where the door is under the welding units 76 so that a zone of welding on the door 16 is under the welding units 76. Means 79 are provided for lowering the welding units 76 as shown in FIG. 10. The welding units 76 are then lowered until they come into contact with and exert pressure on the door 16 adjacent the locations to be welded. Means including the welding power supply 84 is provided to activate the welding units 76 to weld the door 16 at the predetermined locations. After performing the welding function, the welding units 76 are lifted to a retracted position.

The welding units 76 are supported by a welding unit support 82 which also supports the welding power supply units 84 as shown in FIGS. 5 and 6. The welding power supply units 84 supply power to the welding units 76. The electrode wire coils 86 are also supported by the welding unit support 82 and are provided to supply electrode wire to the welding units 76. Located directly beneath the welding units are support or removing power conveyors 90 which are capable of being driven to urge the panel 16 away from the welding units 76. Also positioned under the welding units 76 is a roller support conveyor 92. The support conveyors 90 and 92 serve to support the panel 16 while it is beneath the welding units 76 and when pressure is applied to the door 16 throughout the welding operation.

The carriage 70 sequentially moves the door 16 through the machine so that the parts of the door 16 are welded together as described herein. Upon completion of this welding process, the door 16 is released from the carriage 70, rotated 90° by means of the turntable device 14 shown in FIGS. 1 and 2, and moved through and welded in the second welding apparatus 12. More specifically, the operation of the welding apparatus 10 of the present invention is as follows. Once the components of the door 16 are welded together in a jig as described above, they are placed on the feeding power conveyor 78, roller conveyor 80 and carriage 70. The feeding power conveyor 78 and roller conveyor 80 are adjusted in height to accommodate the door 16. As can be seen in FIGS. 5 and 7, two feeding power conveyors 78 are provided; one such conveyor being adjacent to the carriage 70 and the other conveyor being spaced therefrom. The feeding power conveyor 78 includes feeding conveyor support rollers 94 rotatably supported by the feeding conveyor frame 96. The feeding conveyor frame 96 extends along the length of the feeding power conveyor 78 having at least two outer feeding conveyor support rollers 94 supported thereby as shown in FIG. 5.

An endless feeding conveyor belt 98 is positioned around the feeding conveyor support rollers 94 on the ends of the feeding conveyor frame 96. Thus, as the rollers 94 are rotated, the belt 98 will move in a corresponding direction as will be hereinafter described. The feeding conveyor frame 96 has a support surface between the feeding conveyor support rollers 94 so that when the door 16 is supported on the feeding conveyor belt 98, the belt will be supported by the frame. When the conveyor belt 98 is moved, it will slide along the support surface of the conveyor frame 96.

A feeding conveyor drive motor 100, as seen in FIG. 7, is provided to drive the feeding conveyor support rollers 94 on both of the feeding power conveyors 78 and thereby drive the feeding conveyor belts 98 to move the door assembly 16 in a direction toward the welding units 76. Feeding conveyor transmission means such as the chain drive 102 is provided which mechanically interconnect the feeding conveyor drive motor 100 to the feeding conveyor support roller 94 on the feeding conveyor 78 adjacent to the carriage 70. A feeding conveyor drive shaft 104 mechanically interconnects the driven roller 94 to a roller 94 on the other feeding power conveyor 78 spaced therefrom. Thus, when the feeding conveyor drive motor 100 is activated, both feeding conveyor support rollers 94 are driven.

Due to the frictional engagement of the driven feeding conveyor support rollers 94, the support surfaces 105 of the feeding conveyor belts 98 are driven in a direction towards or away from the welding units 76 dependent on the direction of rotation of the motor 100.

It should be understood that the feeding power conveyor unit 78 may be of any design well known to those skilled in the art and need not be power driven but may simply be a series of rollers, such as roller conveyors 80.

The roller conveyor 80 is also positioned to support the railway car door 16 in a position between the feeding power conveyors 78. The roller conveyor 80 includes a series of roller conveyor support rollers which are rotatably supported in a roller conveyor frame 108. The rollers 106 are freely rotatable and may rotate in either direction. It should be understood that the roller conveyor 80 may be of any design well known to those well skilled in the art.

The feeding power conveyors 78 and the roller conveyor 80 have their respective belt support surfaces 105 and rollers 106 positioned so that they support the door 16. The door 16 is positioned on the conveyors 78, 80 with the panel 18 and gasket retainers 22 thereof facing upwardly with the remainder of the components 22, 24, 26, 28 and 30 facing downwardly and in contact with the conveyors 78, 80.

When the door 16 is positioned on the welding apparatus 10 to begin the welding operations, the leading edge 110 shown in FIG. 11 is placed closest to the welding units 76. The door framing members 20 on the right-hand side of the door, shown in FIG. 8, are supported by the carriage 70 as will be hereinafter more fully described. The feeding power conveyor 78, adjacent to the carriage 70, supports the horizontal door framing members 20 on the top of their reinforcing portions 46 and the tops of the hat-shaped horizontal reinforcing member 24 and Z-shaped horizontal reinforcing member 26. The roller conveyor 80 supports the horizontal members 24, 26 and the hat-shaped vertical reinforcing member 30 of the door 16. The conveyor 78 spaced from the carriage 70 supports the opposite vertically extending door framing member 20.

It should be understood that the height of the support members 68 which support the conveyors 78, 80 are adjusted so that the belt support surfaces 105 and the rollers 106 are at the proper height to support the underside of the door 16 which corresponds to the height at which the door 16 is retained by the carriage 70.

As seen in FIGS. 5 and 7, door securing means 72 is provided on the carriage 70 to secure the panel 16 to the carriage. The door securing means shown in FIGS. 5, 6 and 7 are provided along two locations on the carriage 70. For ease of description, only one of the door securing means 72 will be hereinafter described, but it should be understood that both of the door securing means are of similar construction.

Figure 9:
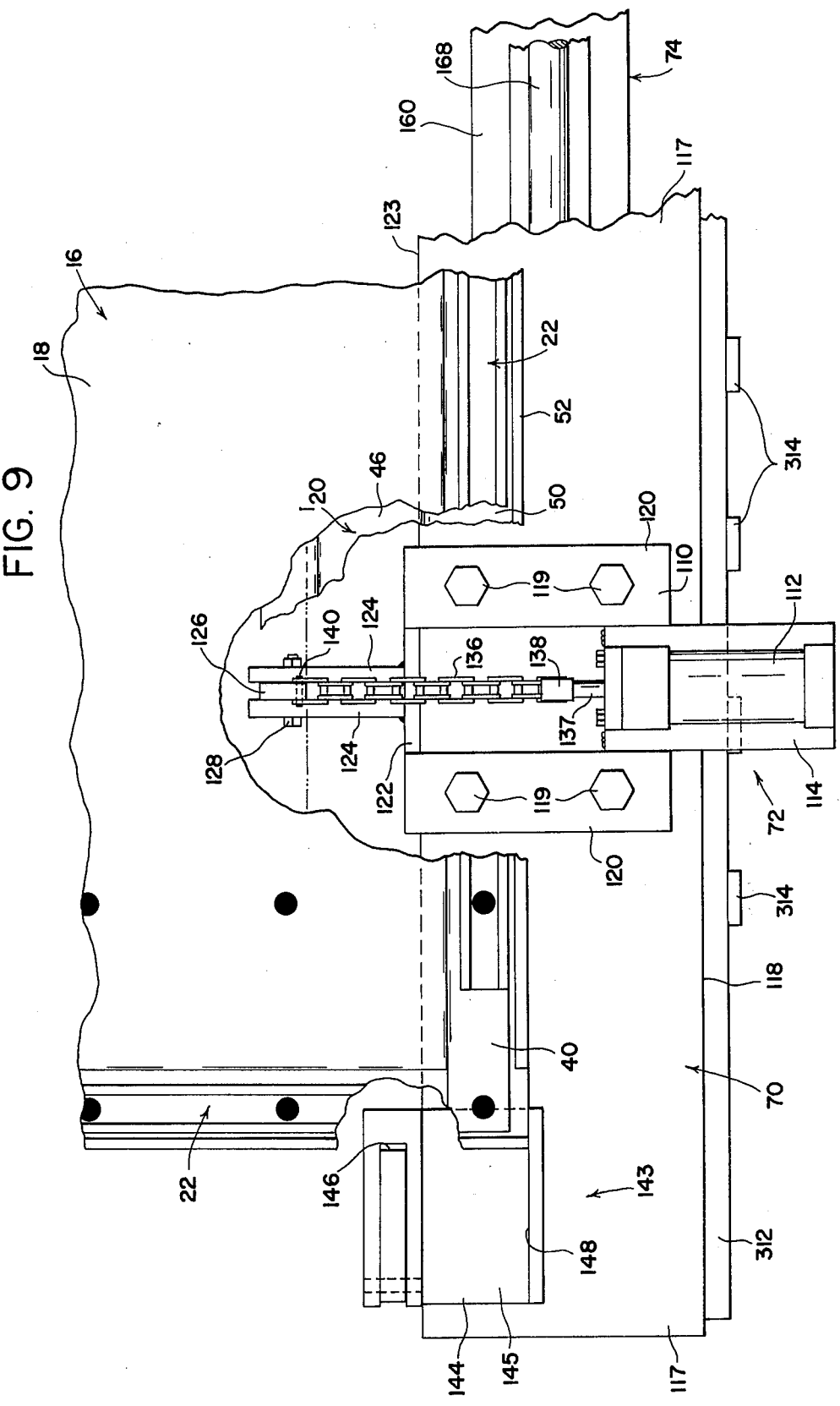
FIG. 9 is a top elevational view of a portion of the drive mechanism shown in FIG. 8 and taken along line 9—9 thereof.

The door securing means 72 includes a fluid cylinder 112 as shown in FIGS. 8 and 9 which is secured to a mounting plate 114 of the mounting bracket 116. The mounting bracket 116 is secured to the top portion 117 of the channel 118 by any conventional means such as by fasteners 119. The horizontal extending portions 120 of the mounting bracket 116, through which the fasteners 119 pass, are adjacent to a vertically extending portion 122 of the bracket. The vertically extending portions 122 are positioned adjacent to the innerflange 123 of the channel member 118.

A pivot bracket member 124 is secured to the vertically extending portion 122 for pivotally mounting a securing lever 126 thereto. As can be best seen in FIG. 9, the pivot bracket member 124 has a forked end which allows the securing lever 126 to be received therein. A lever pivot pin 128 is provided which extends through both portions of the forked end of the pivot bracket 124 and also through the securing lever 126 to pivotally interconnect the member 124 with the lever 126. The lever pivot pin 128 has a head on one end and is secured to the member 124 and lever 126 by any conventional means such as a fastener.

In order to hold the securing lever 126 in an open position, indicated by phantom lines at 129 in FIG. 8, a spring 130 interconnects the pivot bracket member 124 and the securing lever 126. The spring 130 is secured to the pivot bracket member 124 by means of a spring retainer 132 which secures one end of the spring to the pivot bracket member. The other end of the spring 130 is secured to the securing lever 126 by means of a spring eyelet 134. The spring eyelet 134 is positioned on the securing lever 126 so that when the securing lever is in a gripping position, indicated at 134 in FIG. 8, the lever 126 will be urged toward the open position 129 by the spring 130.

To move the securing lever 126 from the open position to the gripping position, a chain 136 is provided to interconnect the movable rod 137 of the fluid cylinder 112 to the securing lever 126. One end of the chain 136 is connected by means of a chain connector 138 to the rod 137 and the other end of the chain is connected to the securing lever 126 by means of a chain pivot pin 140. The chain pivot pin 140 is positioned so that when the rod 137 of the cylinder 112 is moved from an open position indicated at 129a to a gripping position 135a, the force of the spring 130 will be overcome and the securing lever 126 will be moved correspondingly from an open position 129 to the gripping position 135. On the other hand, when the fluid cylinder 112 is deactivated, the spring 130 serves to return the securing lever 126 from the gripping position 135 to the open position 129.

In addition to the conveyors 78, 80, the carriage 70 also supports the door 16 during the operation of the welding apparatus 10. When the door assembly 16 is positioned on the conveyors 78, 80, one of the door framing members 20 are supported by the door supporting surface 124 of the channel member 118 of the carriage 70 as seen in FIG. 7. Alignment means 143 is provided on the carriage 70 and includes a door end stop 144 as seen in FIGS. 6 and 9. The door end stop 144 includes a base portion 145 secured to the top portion 117 of the channel 118 of the carriage 70. Extending vertically from the base portion 145 is an end stop portion 146 and a side stop portion 148 as seen in FIG. 9.

The alignment means 143 also includes door side retainer members 150 secured to the top portion 117 of the channel 118 of the carriage 70 as seen in FIG. 6. The door side retainer members 150 provide for alignment of the door assembly 16 with the carriage 70. The door side retainer members 150 include a base portion 152 secured to the channel 118 of the carriage 70 as seen in FIG. 6. A vertically extending portion 154 extends vertically from the base portion 152 as seen in FIGS. 6 and 8 for retaining and positioning the door assembly 16 as will be herein described.

After the door assembly 16 is placed on the mounting apparatus 10, the door assembly 16 is moved so that the door framing member 20 adjacent the end stop portion 146 is moved into contact with the vertically extending end portion 146. The door assembly 16 is moved laterally so that the protective lip 52 on the door framing member 20 adjacent the door side retainer members 150 is brought into contact with the extending portions 154 thereof. The protective lips 52 of the framing members 20 are in contact with their respective door end stop 144 on the door side retainer members 150.

When the door assembly 16 is in proper alignment with the carriage 70 and secured thereto, it may be moved toward the welding units 76 as will be herein described. In order to secure the door assembly 16 to the carriage 70, the cylinder 112, which is in the open position 129a when the door 16 is placed on the welding apparatus, is activated and moved to the gripping position 135a. This movement is transmitted to the securing lever 126, which is in the open position 129 when the door 16 is mounted on the welding apparatus 10.

When the rod 137 of the cylinder 112 is moved from the open position 129a to the gripping position 135a, the securing lever 126 is rotated from an open position 129 to a gripping position 135. As the securing lever 126 moves towards the gripping position, the securing lever engages a portion of the door framing member 20 of the door 16 and moves the door 16 towards the stop portion 148 of the door end stop 144 and the extending portions 154 of the door side retainer members 150 until the protective lip 52 of the door 16 is engagement therewith.

Throughout the welding operation of the welding apparatus 10, a constant pressure is maintained in the fluid cylinder 112 so that a constant force is transmitted to the securing lever 126 to secure the door assembly 16 to the carriage 70. Conversely, when it is desirable to release the door 16 and remove the door 16 from the welding apparatus 10, fluid pressure is applied to the cylinder 112 in the opposite direction to move the rod 137 of the cylinder 112 from a gripping position 135a to an open position 129a to thereby allow the spring 130 to return the securing lever 126 to its open position 129. It should be understood that a plurality of door securing means 72 may be provided along the carriage 70 as FIG. 7 to more fixedly secure the door 16 to the carriage 70. To allow for movement of the door assembly 16 during the operation of the welding apparatus of the present invention, the carriage 70 is movably mounted on a carriage mounting means 156. The carriage 70 is movable between a loading position, indicated by the position of the door assembly 16 at 185 in connection with the welding apparatus 12 shown in FIG. 1, and an unloading position 186.

The carriage mounting means 156 includes an I beam 158 shown in FIG. 8. The I beam 158 has upper and lower flanges 160 and 162 which are interconnected with a web portion 164. The I beam 158 is secured to the frame member 68 and has a bearing means thereon for movably supporting the carriage 70 thereon. The bearing means mounted on the I beam includes an upper way 166 and a lower way 174 which extend along the length of the I beam 158. The ways 166 and 174 allow the carriage 70 to move along the entire length thereof between the loading position 185 and the unloading position 186.

The upper way 166 is secured to the I beam 158 by means of a base portion 170 which is secured to the upper flange 160 of the I beam 158 by means of thread fasteners 172. It should be understood that any other conventional fastening means may be provided to secure the upper way 166 to the I beam 158. The lower way 174 has a bearing surface 176 and includes a base portion 178 which is secured to the web portion 164 of the I beam 158 by any conventional means such as threaded fasteners 180.

Bearing members 181 are secured to the top portion 117 and the outer flange 121 of the channel member 118 of the carriage 70. The bearing members 181 have a base portion 183 secured to their respective portions of the channel member 118 by means of the threaded fasteners 184. The bearing members 181 include bearing surfaces 182 which are complimentary with the bearing surfaces 168, 176 of the upper and lower ways 166 and 174, respectively, so that the carriage 70 is free to move laterally along the I beam 158 from the loading position 185 to the unloading position 186.

As seen in FIG. 8, means 187 are provided to move the carriage 70 between the loading position 185 and unloading position 186. The drive means 187 includes a drive motor 188 which may be of any design well known to those skilled in the art, which may be powered for rotation in both directions. The drive motor 188 is secured by means of fasteners 189 to the motor mount member 190. The motor mount member 190 is secured to the web of 164 of the I beam 158 by any conventional means such as welding. A reinforcing motor mount support member 191 is provided to interconnect the lower flange 162 of the I beam 158 to the motor mount member 190. A pinion 193 is drivingly secured to the drive shaft 192 of the motor 188 and is in meshing engagement with a rack 194. The rack 194 is secured to the inner flange 123 of the channel member 118 by any conventional means such as the threaded fasteners 196. The rack 194 extends throughout substantially the entire length of the carriage 70.

The carriage drive motor 188 is rotatable in both directions and is positioned with respect to the rack 194 so that it may move the carriage 70 between the loading position 185 and the unloading position 186. The motor 188 is activated to drive the carriage 70 as will be hereinafter more fully described. Thus, it may be understood that by rotation of the pinion 193 in one direction, the carriage 70 will be driven thereby through meshing engagement between the pinion 193 and the rack 194 to move the carriage 70 in a corresponding direction. When the direction of rotation of the motor 188 is reversed, the direction of movement of the carriage 70 will correspondingly be reversed.

The welding units 76 as hereinabove described are positioned in a predetermined spacial arrangement on the welding apparatus of the present invention to weld the components of the door 16 together at predetermined locations. The welding units 76 are supported by the weld unit support means 82 as shown in FIGS. 5 and 6. The weld unit support means includes vertical support members 197, 198 and 199 having one end thereof positioned on the floor structure on which the welding apparatus of the present invention is located and extends upwardly therefrom. The vertical support members 197, 198 and 199 are provided on both sides of the welding apparatus as seen in FIG. 5. Interconnecting the other ends of the vertical support members 197, 198 and 199 are upper horizontal support members 200. The horizontal support members 200 are secured to the vertical support members 197, 198 and 199 by any conventional means well known to those skilled in the art such as welding. The welding unit support means 82 includes a lower horizontal support member 201 which interconnects vertical support members 198 and 199, as best seen in FIG. 6. The vertical position of the lower horizontal support member 201 is such that it is slightly below carriage 70 to thereby allow the welding unit 76 to be more completely adjustable, as will be hereinafter more fully described. Interconnecting the support members 197, 198, 199, 200 and 201 on each side of the welding apparatus of the present invention are upper cross members 202, 203 and 204, as seen in FIGS. 5 and 6. The upper cross members 202 and 203 support the welding power supply units 84a, 84b, 84c and 84d, as seen in FIGS. 1 and 7.

The welding unit support means 82 also includes a pair of vertically extending threaded rods 205 on each side of the welding apparatus. The vertically threaded rods 205 are secured on one end to the upper horizontal support member 200 and on the other end thereof to the lower horizontal support member 201, as best seen in FIG. 6. To effect securement of the threaded rods 205 to the support members 200 and 201, blocks 206 are secured to the members 200 and 201, which blocks have threaded apertures therein for engaging and receiving the opposite ends of the vertical threaded rods 205, as best seen in FIG. 6. The rods 205 are secured to the blocks 206 by any conventional means well known to those skilled in the art such as set screws.

The welding support means 82 includes a lower cross member 207 having apertures 208 in their opposite ends. Apertures 208 receive the vertical threaded rods 205 and are free to move vertically thereon, as seen in FIG. 6. Adjustment plates 209 are secured along the length of the lower adjustable cross members 207 by any conventional means such as welding as seen in FIG. 2. Adjustment nuts 210 are provided which threadedly engage the threaded rods 205 and are capable of moving and adjusting the lower adjustable cross members 207 in a vertical direction with respect to the door assembly 16.

The welding units 76a, 76b, 76c, 76d, 76e, 76f, 76g and 76h, as shown in FIG. 1, are of a design which join workpieces together by the gas metal arc welding process. These welding units are of the same construction described hereinafter in connection with the welding unit 76.

The welding unit 76, as shown in FIG. 10, includes a frame 211 having a channel shaped upper portion 212, channel shaped side portions 214 and a bottom plate 216, each of which portions are interconnected by any conventional means such as welding to provide the frame 211. The lower securing flanges 218 are secured to each of the side portions 214. The lower securing flange 218 has a horizontally extending portion 220. Upper securing flanges 222 are secured to each of the side portions 214 and have a horizontally extending portion 224 with a threaded aperture therein.

In order to secure the frame 211 to the lower adjustable cross members 207, the welding unit 76 is positioned so that the horizontal extending portions 220 of the lower securing flanges 218 are in contact, with and resting on the lower portion of the lower cross members 207. Threaded fasteners 228 are threadedly engaged by the threaded aperture 226 in the horizontal extending portion 224 of the upper securing flange 222. The threaded fasteners 228 are tightened until the threaded fasteners come into contact with the upper surface 230 of the plate 209 on the lower adjustable cross members 207. A nut 229 is provided to lock the threaded fastener 228 in any desired position.

The above-described mounting system for securing the frame 211 of the welding unit 76 to the lower adjustable cross member 207 allows the welding unit 76 to be moved laterally along the lower adjustable cross members 207. This adjustment allows the lateral position of the weld performed by the welding unit 76 to be adjusted as desired and thereby allows welds to be made as required by the particular workpieces to be welded.

The welding head 232, as shown in FIG. 10, is movably mounted with respect to the frame 211. A fluid cylinder 234 is provided to move the welding head 232 between a retracted position 246 and a welding position shown in phantom lines at 248. The fluid cylinder 234 is secured to a vertically extending mounting plate 236 which is welded to the upper portion 212 on the frame 211. The fluid cylinder 234 has a rod 238 which is movable and is connected to a piston inside of the cylinder as is well known to those skilled in the art. At the end of the rod 238, a clevis 240 is attached and is connected on its other end to the plate 245 of a moving frame 244 by means of a connector pin 242.

The movable frame 244 has the welding head 232 secured thereto and is movable between the retracted position 246 and the welded position 248. The movable frame 244 has an upper member 250, a lower member 252, and side members 254 and 256, which are interconnected by means of welds to provide the rigid moving frame 244.

Guide members 258 are secured to the side members 254 and 256 and have bearing portions 260 therein. The bearing portions receive guide shafts 262 which guide shafts 262 are secured to the frame 211. Pockets 264 are provided in the bottom portions 216 of the frame 211 and guide shaft support members 268 are secured to the side portions 214 of the frame 211. The guide shaft 262 is received by the pockets 264 and apertures 269 in the guide shaft support members 268 so that the guide shafts 262 are secured to the frame 211. The bearing portions 260 of the guide members 258 are in sliding engagement with the guide shafts 262. The movable frame 244 is movable longitudinally along the shafts 262 to allow the fluid motor 234 to move the movable frame, and consequently, the welding heads 232 between a retracted position 246 and a welding position 248.

A wire feed motor 270 of any conventional design well known to those skilled in the art is mounted to and secured in the moving frame 244. The wire feed motor 270 operates to feed electrode welding wire 272 from the coil 86 through a wire feed tube 276 to and through the welding head 232 toward the workpieces to be welded. A bracket member 274 is provided to secure the wire feed motor 270 to the movable frame 244.

To supply welding power from the welding power supply unit 84, a wire 277 connected to the welding power supply 84 is secured to an electrical coupling device 278 which transfers the electrical welding power from the wire 277 to the electrode welding wire 272. Thus, when the welding wire 272 is fed toward the parts to be welded, it is electrically charged. As is understood the workpieces are electrically connected so that they have an opposite electrical charge.

The welding head 232 has a shielding member 279 which is hollow to allow the welding wire 272 and shielding gas to flow therethrough and has openings 280 provided on the workpiece contacting portion 281 thereof. The shielding member 279 has a clamping portion 282 which contacts the workpieces during the actual welding operation and exerts pressure on the workpieces 16 adjacent the location to be welded.

In order to allow the welding wire 272 to move toward the workpieces 16 to be welded and allow the shielding gas to flow to the location to be welded when desired, an opening 284 is provided in the lower member 252 of the moving frame 244. A manifold 286 is secured to the lower member 252 of the moving frame 244 and receives a flow of shielding gas through the flexible conduit 288 when the shielding gas is supplied to the flexible conduit 288. It should be understood that there are control valves for selectively providing the supply of shielding gas through the conduit and turning off the supply of shielding gas as will be hereinafter further described. The shielding gas moves through the manifold through the hollow shielding member 279 and downwardly toward the workpiece. The shielding gas surrounds the location to be welded and flows out of the opening 280 in the welding head 232 to shield the location to be welded from the atmosphere.

The above-described apparatus is capable of providing a gas metal arc weld whereby an arc is maintained between a continuously fed electrode wire 272 and the workpieces to be joined 16. The shielding gas is provided through the welding head 232 to exclude the oxygen and nitrogen in the air from the location to be welded, thus eliminating the formation of oxides and nitrides which decrease the metal-weld ductility and sometimes the strength. The particular gas used as a shielding gas is dependent on the metals to be joined as is known to those skilled in the art. If carbon steel is to be joined, a mixture of argon and carbon dioxide, or carbon dioxide alone, or any other appropriate shielding gas may be used. It should be understood though, as pointed out above, that the type of shielding gas may change, dependent on the material to be joined.

After the shielding gas begins to flow through the welding head 232, the welding wire 272 is fed toward the workpieces 16 which have been assembled in their respective positions in which they are to be joined as hereinabove described. The welding power is supplied from the power supply 84 between the workpieces 16 and the welding wire 272 by means of the electrical connector 278. It should be understood that the other connection of the welding power supply 84 is electrically connected to the workpieces 16 to be joined in a manner well known to those skilled in the art.

As the welding wire 272 continues to move toward the workpieces 16, an opening is burned into the workpieces 16 which is subsequently filled with the molten metal from the welding wire 272. The shielding gases protect the melting welding wire from the atmosphere as is known to those skilled in the art. After the weld is allowed to cool, the shielding gas need no longer be supplied to the welding zone.

To support the workpieces 16 to be joined, the removing power conveyors 90 are provided as seen in FIG. 1. The conveyors 90 are constructed in the same manner described in connection with the feeding power conveyor 78. A roller conveyor 92 also provides additional support to the door 16 as it passes through the apparatus 10. As can be seen in FIG. 10, a portion of the removing power conveyor 90 and as seen in FIG. 1, a portion of the roller conveyor 92 is positioned beneath the welding unit 76 of the welding apparatus 10 to provide for support of the door 16 when the welding head 232 comes into contact and exerts pressure on the door 16 during the welding cycle.

The welding heads 76 on the welding apparatus 10 are spacially arranged to perform the welds indicated by the black dots on the door assembly shown in FIG. 11. The eight individual welding units 76a, 76b, 76c, 76d, 76e, 76f, 76g and 76h are moved on the lower cross member 207 of the welding unit support means 82 so the spacial arrangement of their respective welding heads 232 are in alignment with the lines of weld 60a, 60b, 60c, 60d, 60e, 60f, 60g and 60h, respectively. The leading edge 110 of the door 16 shown in FIG. 11 is mounted toward the welding heads 76.

Figure 16:
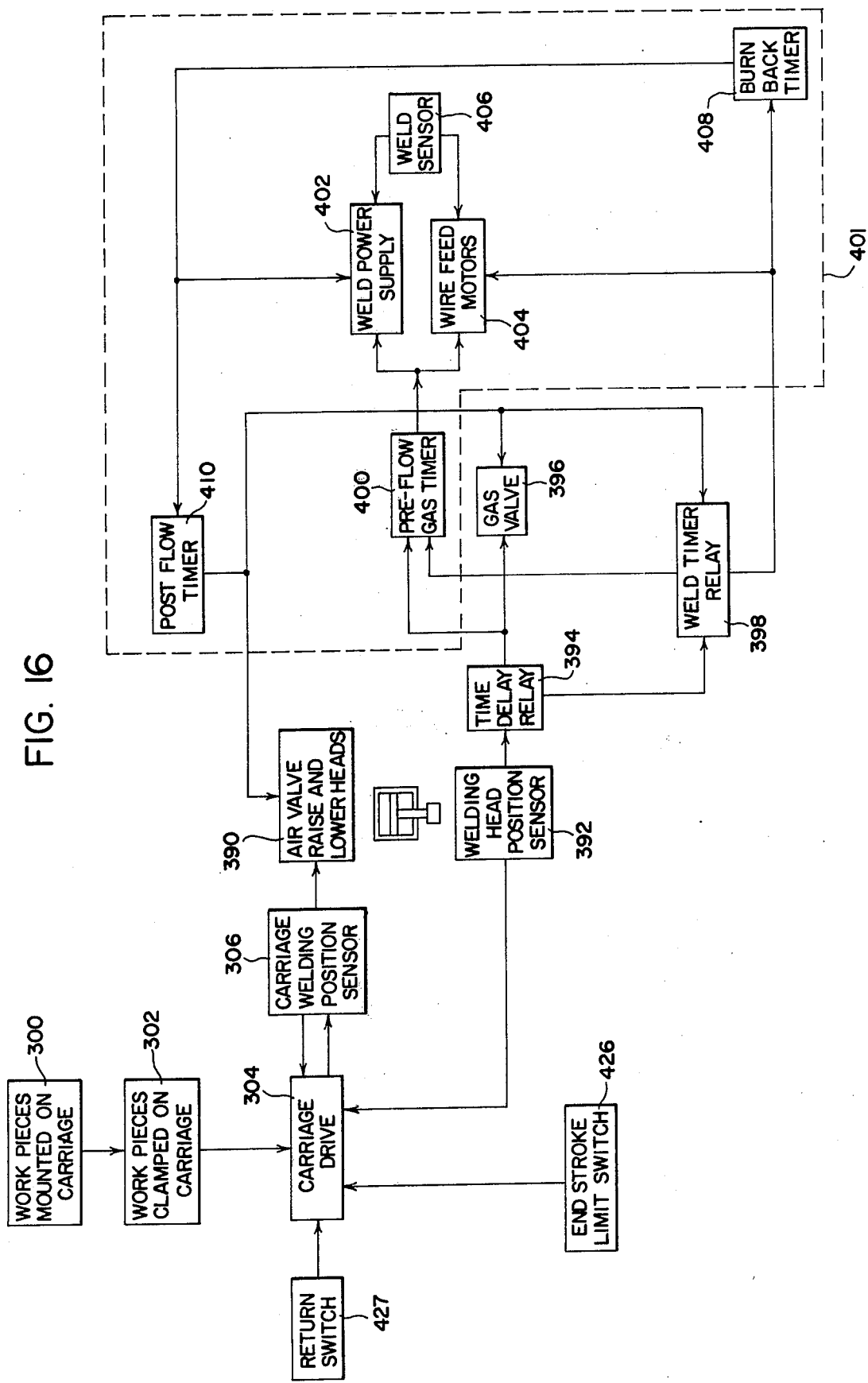
FIG. 16 is a schematic diagram showing a portion of the controls for controlling the welding apparatus shown in FIG. 1.

The operation of the welding apparatus 10 is best described in connection with the diagram shown in FIG. 16. FIG. 16 schematically shows various circuitry, valves, sensors and other means for performing various control functions described in FIG. 16. It is within contemplation of this invention that means other than the means shown in FIG. 16 and other means described in conjunction therewith may be used.

As has been previously described, the step of mounting the workpieces 16 on the carriage 70, indicated at 300 in FIG. 16, is performed manually by placing the components of the door 16, which have been previously jig welded together, on the feeding power conveyor 78,
roller conveyor 80 and carriage 70. These workpieces are then manually positioned against the end stop portion 146 of the door end stop 144.

Means are provided for then clamping the workpieces comprising the door 16 onto the carriage 70, as indicated at 302 in FIG. 16. Such means includes the fluid cylinder 112 to which pressurized fluid is supplied so that it moves from an open position 129a to a gripping position 135a and consequently, the securing lever 126 is moved from an open position 129 to a gripping position 135. Thus, door 16 is secured to the carriage 70 as hereinabove described.

Means are then provided, as indicated at 304, for moving the workpieces 16 under the welding heads 232. This function is accomplished by activating the carriage drive means 187 so that the carriage drive motor 188 drives the carriage 70 towards the welding units 76.

Means, indicated at 306, are provided for stopping the door 16 under the welding heads 232. When the carriage 70 moves to a position whereby the first weld locations indicated by the first area of black dots in the weld lines 60a, 60d, 60g and 60h are directly beneath the welding heads 232 of the welding units 76a, 76b, 76g and 76h of the welding apparatus 10, the carriage welding position sensor means 306 senses that the carriage and consequently the door 16 is in such a position and stops further movement of the carriage 70. It should be understood that the carriage drive means 304 is also connected to the feeding conveyor drive motor 100 of the feeding power conveyors 78 and with the drive motor of the removing power conveyor 90, so that when the carriage 70 is moved, the feeding power conveyors 78 and the removing power conveyors 90 are also driven.

The carriage welding position sensor means 306 includes a switch 307, as seen in FIG. 8, having a sensing arm 308. The switch 307 is secured to a fixed frame 309 adjacent the welding units 76. A channel member 312 is secured to the outer flange portion 121 of the carriage 70 and has an outer lip portion 313 for securing a stop member 314 thereto. The stop member 314 has an opening therethrough for receiving the threaded fastener 316. A threaded block member 318 is positioned inside of the channel 312 and is biased toward the outer lip portion 313 by the spring 320. The threaded fastener 316 threadedly engages the threaded block 318 and thereby secures the stop member 314 thereto.

As can be seen in FIG. 6, the channel 312 extends along substantially the entire length of the carriage 70. The stops 314 are positioned along the carriage 70 and secured thereto as described above in every position where it is desirable to stop the carriage and perform the welding function by at least one of the welding heads 76 of the welding apparatus 10. When the first stop 314 moves the sensing arm 308 of the switch 307, the carriage drive motor 188 is stopped and the door 16 is positioned beneath the welding heads as described above.

Figure 15:
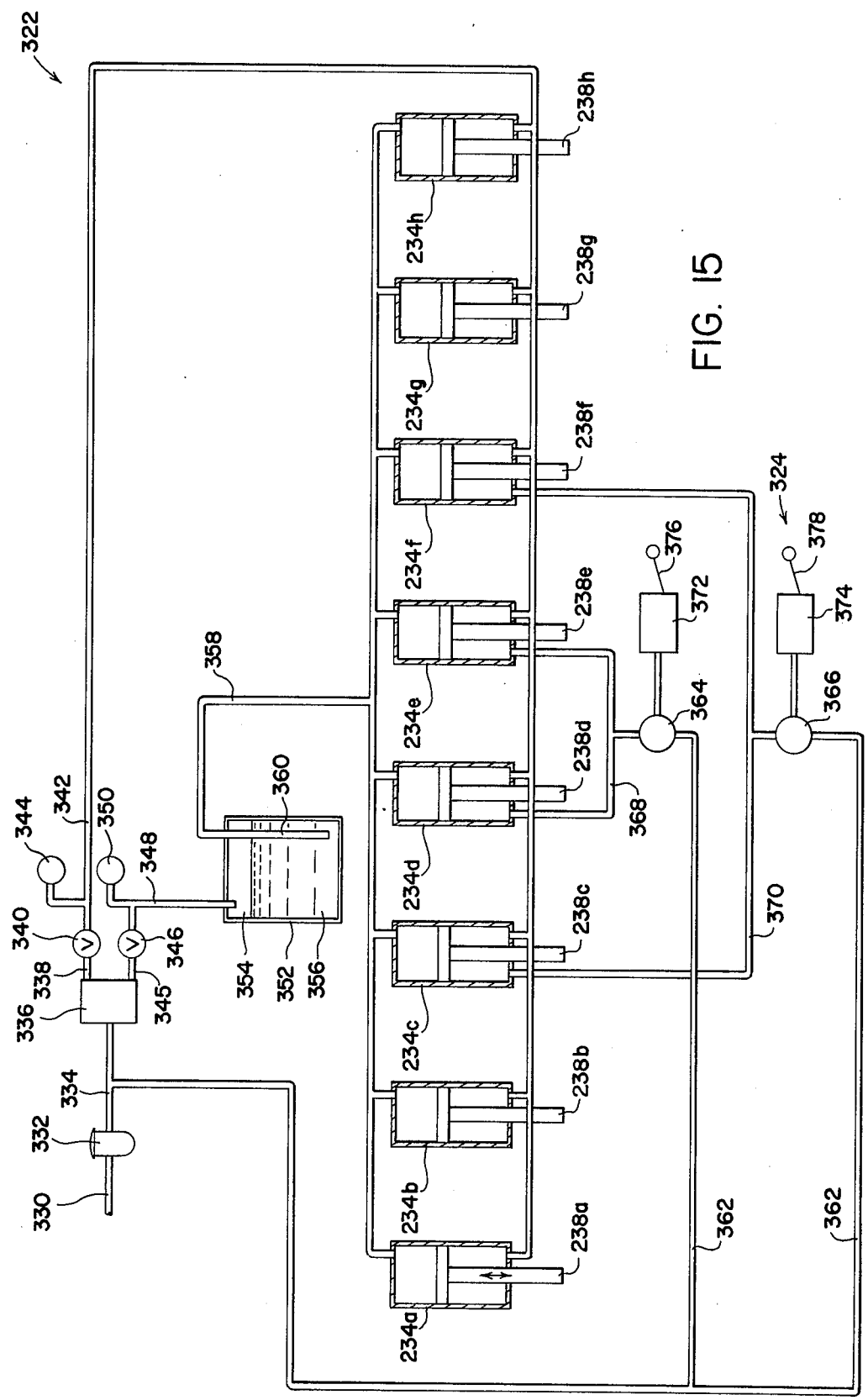
FIG. 15 is a schematic view of the control system for controlling movement of the welding heads of the welding apparatus shown in FIG. 1.

Each of the welding units 76a through 76h have a corresponding cylinders 234a through 234h as shown in FIG. 15 to move their respective welding heads 232 between a retracted position 246 and a welding position 248. Means generally indicated at 322 are provided for selectively moving the welding heads 232a through 232h. Means, generally indicated at 324, are provided for controlling the movement of the fluid cylinders 234c, 234d, 234e and 234f, as seen in FIG. 15.

At this point, it should be understood that there is a first group of welding units 76a through 76d, generally indicated at 326 in FIG. 1, and a second group of welding units, generally indicated at 328, including welding units 76e through 76h. As will hereinafter be more fully described, all of the welding heads in both the first group 326 and the second group 328 are lowered in unison except if otherwise controlled by the control means 324. The first group of welding heads 326 then operate to perform welds, and upon completion of those welds, the second group 328 operate to perform welds.

The means 322 for lowering the respective heads 232 of the welding units 76a through 76h include a supply of pressurized air from any well known air pressure supply through a conduit 330 to a lubricator 332, as shown in FIG. 15. The lubricator 332 operates to lubricate the pressurized air so that it may be used directly in the operation of the fluid cylinders 234a through 234h. The pressurized air flows from the lubricator 332 through the conduit 334 to a valve 336.

In a neutral position, the valve 336 allows the lubricated pressurized air to flow through the conduit 338 to the pressure reducing valve 340. The pressure reducing valve 340 reduces the pressure of the pressurized air and allows the pressurized air to flow through the conduit 342 to the bottom of each of the cylinders 234a through 234h. An air pressure switch 344 is connected to the conduit 342 to sense the pressure of the air in the bottoms of each of the cylinders 234a through 234h. Thus, when the welding apparatus 10 and the means 322 are turned on with the valve 336 in the neutral position, lubricated pressurized air flows through the valve 336 to the bottoms of the cylinders 234a through 234h to raise all of the welding heads to the retracted position 246. When the rods 238a through 238h associated with their respective cylinders 234a through 234h reach their retracted position, the air pressure switch 344 senses that due to an increase of pressure in the conduit 342, the rods are in their retracted position and provides a signal as will be hereinafter described.

When it is desirable to lower the rods 238a through 238h, the valve 336 is activated and the flow of pressurized air through the conduit 338 is blocked and consequently, the bottom of the cylinders 234a through 234h are no longer supplied with pressurized air through the conduit 342. When in the activated position, the valve 336 supplies pressurized air through the conduit 345 to the air pressure reducing valve 346. The valve 346 reduces the pressure of the air moving through the valve 346 and supplied therefrom through the conduit 348 to the air over hydraulic cylinder 352. An air pressure switch 350 is connected to the conduit 348 to sense the pressure in the conduit 348.

The air over hydraulic cylinder 352 has an upper portion 354 which receives the pressurized air from the conduit 348 and a lower portion 356 which contains hydraulic fluid. The conduit 358 has a lower portion 360 extending to substantially the bottom of the lower portion 356 of the air over hydraulic cylinder 352. Thus, when pressurized air is supplied to the upper portion 354, the hydraulic fluid in the lower portion 356 is pressurized and forced to flow through the conduit 258 to the tops of the cylinders 234a through 234h. It should be understood that the air over hydraulic cylinder 352 may be of any conventional design well known to those skilled in the art.

When pressurized hydraulic fluid is supplied to the upper portions of the cylinders 234a through 234h, their respective rods 238a through 238h are urged in a downward direction. If there is no air pressure in the lower portion of the cylinders 234a through 234h, the rods 234a through 234h will move from the retracted position 246 to the welding position 248.

At this point, it should be understood that movement of the rods 238a through 238h may be controlled by supplying pressurized air to the bottom of the cylinder 234a through 234h or any one thereof at a pressure greater than the pressure of the hydraulic fluid supplied to the tops of the cylinders to selectively control the movement of any particular rod. It should also be understood that to control any particular cylinder, it is possible to supply a hand valve at the top of each of any one of the cylinders 234a through 234h to eliminate the supply of pressurized hydraulic fluid from the top of the valve and hold that cylinder rod 238 in a retracted position 246. Thus, that particular welding head would not operate during the operation of the welding apparatus 10.

When the cylinder rods reach the welding position 248 or are otherwise in contact with the workpieces to be welded and exerts pressure thereon, the pressure of the hydraulic fluid in the conduit 358 and consequently the pressure of the pressurized air in the conduit 358 increases. This increase in pressure is sensed by the air pressure switch 350 to thereby sense when the rods 238a through 238h are in the welding position 248 or otherwise restrained. The switch 350 is capable of providing a signal when the pressure so increases as will hereinafter be described.

In some cases, as will be seen in connection with the door 16, it is desirable for certain of the welding units 76a through 76h to be restrained from downward movement and to remain in the retracted position 246 so that a particular welding unit does not weld. The control means 324 is provided to so control the movement of the cylinders 234c through 234f. Pressurized air is supplied to the cylinder control means 324 through conduit 362. The electrically controlled valves 364 and 366 are connected to the conduit 362 and receive the pressurized air therefrom. The valve 364 is connected by means of conduit 368 to the lower portion of the cylinders 234d and 234e. The valve 366 is connected to the lower portion of the cylinders 234c and 234f by conduit 370.

The valves 364 and 366 in a normal unactivated position stop the flow of pressurized air through the conduit 362 and through the conduits 368 and 370 to the lower portions of their connected cylinders and thereby allow movement thereof in a downward direction. A switch 372 is connected to the valve 364 and a switch 374 is connected to the valve 366. When the switch 372 is activated by movement of the activating arm 376 thereof, a signal is sent to the valve 364 and the valve 364 is activated to allow pressurized air to flow through the conduit 368 to the bottom of the cylinders 234d and 234e. Similarly, when the activating arm 378 of the switch is moved, the switch 374 sends a signal to the valve 366 which allows pressurized air to flow through the conduit 370 to the lower portions of the cylinders 234c and 234f.

The pressure reducing valve 346 substantially reduces the pressure of the pressurized air flowing into the air over hydraulic cylinder 352, and thereby decreases the pressure of the hydraulic fluid flowing into the tops of the cylinders 234a through 234h. The pressure of the pressurized air flowing through conduits 362 and then through conduits 368 and 370 to their respective cylinders is not reduced and is substantially greater than pressure of the hydraulic fluid supplied to the tops of the cylinders.

The pressurized air supplied by conduits 368 and 370 overcomes the pressure in the tops of the cylinders 234c through 234f and holds the rods 238c through 238f in a retracted position 246 and does not allow them to move to a welding position 248. Thus, when the welding units 76c through 76f are so held in a retracted position 246, they are not capable of welding and no weld is performed at that location. It should also be understood that if it is desirable for one of the heads 76 not to weld, it may continue to function and move up and down but may be electrically disconnected so that it does not perform any welding function.

As seen in FIG. 8, the switches 372 and 374 are mounted adjacent to the switch 307 and have their respective activating arms 376, 378 extending toward their respective channel members 380, 381. The stops 382 and 383 are positioned along their respective channels 380, 381 when it is desirable to hold the cylinders 234c through 234f which they control in a retracted position 246. As can be seen in FIG. 6 in the first welding position indicated at 420, the stops 382 and 383 are provided on their respective channels 380, 381 and serve to activate their respective switches 372, 374 when in that position to hold the rods 238c through 238f in a retracted position so that no welding is performed by their respective welding heads 76c through 76f. In the first welding position indicated at 420, the welding units 76a, 76b, 76g and 76h perform the first group of welds along the weld lines 60a, 60b, 60g and 60h of the door 16 shown in FIG. 11.

When the carriage 70 moves the door 16 to the second welding position indicated at 422, it is desirable to perform welds at locations along the weld lines 60a, 60b, 60c, 60f, 60g and 60h. Thus, no stop 383 is provided and the switch 374 is not activated so that the valve 366 stays in its unactivated or neutral position and block the flow of pressurized air to the bottom of cylinders 234c and 234f. On the other hand, the switch 372 is activated to maintain rods 238d and 238e in a retracted position so that no welding is performed by their respective welding units 76d and 76e. Accordingly, welding is performed in the locations along lines 60a, 60b, 60c, 60f, 60g and 60h. It should be understood that when the stop 382 in connection with switch 372 and valve 364 is removed, the welds along lines 60d and 60e, as seen in FIG. 11, will be performed on the door 16 and operates in a corresponding manner to that described in connection with the removal of the stops 383 in connection with the switch 374 and valve 366.

It should also be understood that individual control of the cylinders 234a through 234h may be attained by providing an individual channel and stop members for activating individual switches and valves to supply pressurized air to the bottom of any one of the cylinders. Thus, each of the welding units 76a through 76h may be individually controlled so that no welding is performed by that welding unit in any particular welding location.

When the carriage reaches the first welding position 420, a signal is provided by the carriage welding position sensor 306 to means 390 for lowering the predetermined welding heads. The switch 336 of the means 390 is activated and the predetermined welding units 76a, 76b, 76g and 76h are lowered so that their respective welding heads 232 come into contact with and exert pressure on the workpiece 16. As can be seen in FIG. 11, the locations 60a, 60b, 60g and 60h are at substantially the same depth. The welding units 76c through 76f are held in a retracted position described above in connection with FIG. 15.

When the clamping portions 282 of their respective welding units 76a, 76b, 76g and 76h comes into contact with the door 16, movement of their respective rods 238a, 238b, 238g and 238h are stopped and the pressure sensing switch 350 performs the function 392 of sensing that the welding units 76a, 76b, 76g and 76h are in their welding positions. A signal is then sent to a time delay relay 394 which allows a period of time to assure that the welding heads 76a, 76b, 76g and 76h are in contact with the door 16. The pressure generated by the hydraulic fluid supplied to the top of the pressurized cylinders 234a, 234b, 234g and 234h exerts a pressure on the respective welding heads 232 and consequently, the clamping portions 282. Consequently, a clamping force is provided to the components of the door 16 to insure contact of the parts to be welded.

After it times out, the time delay relay 394 provides a signal to a gas valve 396 to thereby allow the shielding gas to flow through to the conduit 288 and manifold 286 to the welding head 232 and thereby provide a shielding gas in the location to be welded. The shielding gas flows through the openings 280 and continues to flow throughout the welding operation as hereinabove described to provide a shielding atmosphere in the location to be welded.

The time delay relay 394 also sends a signal to a weld timer relay 398. After it times out, the weld timer relay 398 provides a signal to the preflow gas timer 400. When a signal is also received by the preflow gas timer 400 from the timer delay relay 394, the welding cycle begins.

It should be understood that the functions 394, 396, 398 and 400 may be connected in any other operable manner. The time delay relay 394 may be connected to provide a signal to the weld timer relay 398 after the time delay relay times out. When the weld timer relay 398 times out, it turns on the gas valve 396 and preflow gas timer 400 to begin the welding cycle.

The functions described by functions 400 through 410 are enclosed by dash lines 401 and may be performed by any known automatic control panel such as Control Panel 371823-1 and 371823-2 commercially available from the Hobart Brothers Company, Troy, Ohio.

The preflow gas timer 400 allows shielding gas to flow for a predetermined period and thereby purge the system and assure that shielding gas is present in the location to be welded. When the preflow gas timer 400 times out, a signal is sent to the weld power supply units 76 which are to be activated by means indicated in FIG. 16 at 402. It should be understood at this point that the first group 326 of welding heads are activated in the first cycle of the welding control by the welding panel 401 and thereafter, the second group of welding heads 328 are activated by the same welding panel 401, as will be hereinafter described. Thus, welding power is supplied to the welding units 76a and 76b of the first group of welding heads 326 by the weld power supply 76.

Simultaneously with the step of activating the weld power supply 402, the preflow gas timer 400 also activates the wire feed motors 270 associated with the first group of welding units 326 which are to be activated. The wire feed motors 270 on the welding units 76a and 76b are activated by control means in the panel 401 during welding in the first welding zone 420, indicated by the numerals 404 in FIG. 16. The wire feed motors 270 begin to feed the welding wire 272 associated therewith through the wire feed tube 276 and the welding head 232 toward the workpieces 16 to be welded in the desired location of the weld. As the wire 272 approaches the workpieces, an arc is ignited and the welding sensors 406 sense that the arc is ignited. The sensor 406 provides a signal to the power supply control 402 and the wire feed motor control 404 and decreases the speed of the motors 270 from the initial wire feed speed and the weld current from the power supply 84, as is known to those skilled in the art.

When the weld timer relay 398 times out, a signal is sent to the welding wire feed motor 404 which stops the welding wire feed motors 270. Since the welding wire 272 is correspondingly stopped, the welding wire burns back far enough to clear the weld puddle in an atmosphere of sheilding gas.

Simultaneous with the above step, the weld timer relay 398 provides a signal to the burnback timer 408 to thereby activate the burnback timer. The burnback timer 408 allows sufficient time for the weld wire 272 to burn back clear of the weld puddle.

When the burnback timer 408 times out, a signal is sent to the weld power supply control 402 which shuts off the weld current supplied by the power supply 84. Simultaneously, the burnback timer 408 sends a signal to a postflow timer 410 to start the postflow timer and allow the shielding gas to continue to flow and thereby allow the weld puddle to cool in an atmosphere of shielding gas. When the postflow timer 410 times out, it sends a signal to close the gas valve 396 so that the shielding gas no longer flows to the welding heads and simultaneously, the postflow timer restarts the weld timer relay 398.

When the weld timer relay 398 is so activated, a signal from the weld timer relay activates preflow gas timer 400 which in turn activates the gas valve 396 so that shielding gas is provided to the second group of heads 328 as described above in connection with the first group of heads 326. The control panel 401 then operates to perform welds with the second group of welding units 328 in a manner similar to that described above in connection with the first group of welding units 326.

When the postflow timer 410 times out after the operational welding cycle of the second group of welding units 328, a signal is sent by the postflow timer to close the gas valve 396 so that shielding gas no longer flows to the welding units 76. The postflow timer 410 also provides a signal to the valve 336 which performs the function of raising the welding units 76 as indicated at 390 in FIG. 16. When the air valve 336 is deactivated by the signal from the postflow timer 410, pressurized air is provided through conduit 342 to the bottoms of all of the cylinders 234a through 234h to raise any one of the rods 238a through 238h of the welding units which are in welding position 248. The welding units 76 are thereby moved to the retracted position 246. When so deactivated, the valve 336 removes the fluid pressure from the top of the cylinders 234a through 234h.

The air pressure valve 344 operates in a manner similar to the operation of air pressure sensor 350 and senses when the pressure in the conduit 342 increases to a predetermined level and correspondingly when the welding units 76a through 76h reach the retracted position 246. The air pressure valve 344 performs the function indicated at 392 in FIG. 6 so that when the welding units 76a through 76h reach the top of their stroke, a signal is sent to the carriage drive means control 304. The carriage drive means control 304 provides power to the carriage drive means 187, motor 188, the feeding power conveyor 78 and the removing power conveyor 290 so that the door 16 is moved to the second welding position indicated at 422 in FIG. 11.

The welding apparatus 10 of the present invention is capable of welding two adjacent locations at different depths and of "stepping over" obstacles and changes in contours of the workpieces as they pass through the welding machine. As seen in FIG. 11, the depth of the first welds 420 on the lines of weld 60a, 60b, 60g and 60h are at the same level. During the second weld 422 along lines 60a and 60b, the depth of the weld along line 60a is greater than the depth of the weld along the line 60b.

When the welding unit 76b is moved to its retracted position 246 after its first weld and the door 16 is moved with respect thereto, the welding unit 76b has in effect "stepped over" the obstacle provided by the off-set portion 40. When the welding units 76 are lowered to perform the second weld along the weld area indicated at 422, the welding head of the welding unit 76b is at a depth different than the height of the head 76a. It should also be understood that in the second welding pass made by the welding apparatus 10, the welds located along lines 60c and 60f are made by welding units 76c and 76f.

It should be understood that the welding operation described by the diagrams shown in FIG. 16 is repeated. The carriage drive 304 is activated by the welding head position sensor 392 upon completion of the welds in the first area 420. When the carriage 70 brings the second welding area under the welding units 76, the carriage 70 is stopped by the switch 307 and the welding heads 76a, 76b, 76c, 76f, 76g and 76h perform the welding function in their respective first group 326 and second group 328 as defined hereinabove. The welding apparatus continues to perform the welds shown in black dots in FIG. 11 in a similar manner until the welding position 424 is reached and at that point, the welding units 76a, 76b, 76d, 76e, 76g and 76h perform a series of welds in a pattern described by black dots in FIG. 11 and the welding units 76c and 76f are not activated. After all of the above sequential welds indicated by black dots in FIG. 11 are performed along the lines 60a, 60b, 60c, 60d, 60e, 60f, 60g and 60h, the carriage 70 moves toward the unloading position 186.

To stop the carriage drive motor 188 and the motors associated with the feeding power conveyors 78 and the removing power conveyors 290, an end stroke limit switch 426, as seen in FIG. 8, is provided. When the carriage 70 reaches the stop 428, the switch 426 is activated to stop the motor 188 to thereby stop the carriage 70 in the unloading position. After the door 16 is unloaded from the welding apparatus 10, a manual switch 427 is activated to signal the carriage drive motor 188 through control 304 to rotate in an opposite direction and return the carriage 70 from its unloading position 186 to its loading position 185 thereby rendering the apparatus 10 capable of having another door 16 mounted thereon. When the carriage 70 reaches the loading position 185, the switch 426 is tripped by another stop 428 mounted on the carriage 70 and the drive motor driving the carriage 70 is stopped. After the welding apparatus 10 has performed its welding functions on the door 16 and the door 16 is in the unloading position 186, the door 16 is released from securement with the carriage 70 of the apparatus 10 and moved by the conveyors 90 towards the turntable device 14 shown in FIG. 1.

Figure 4:
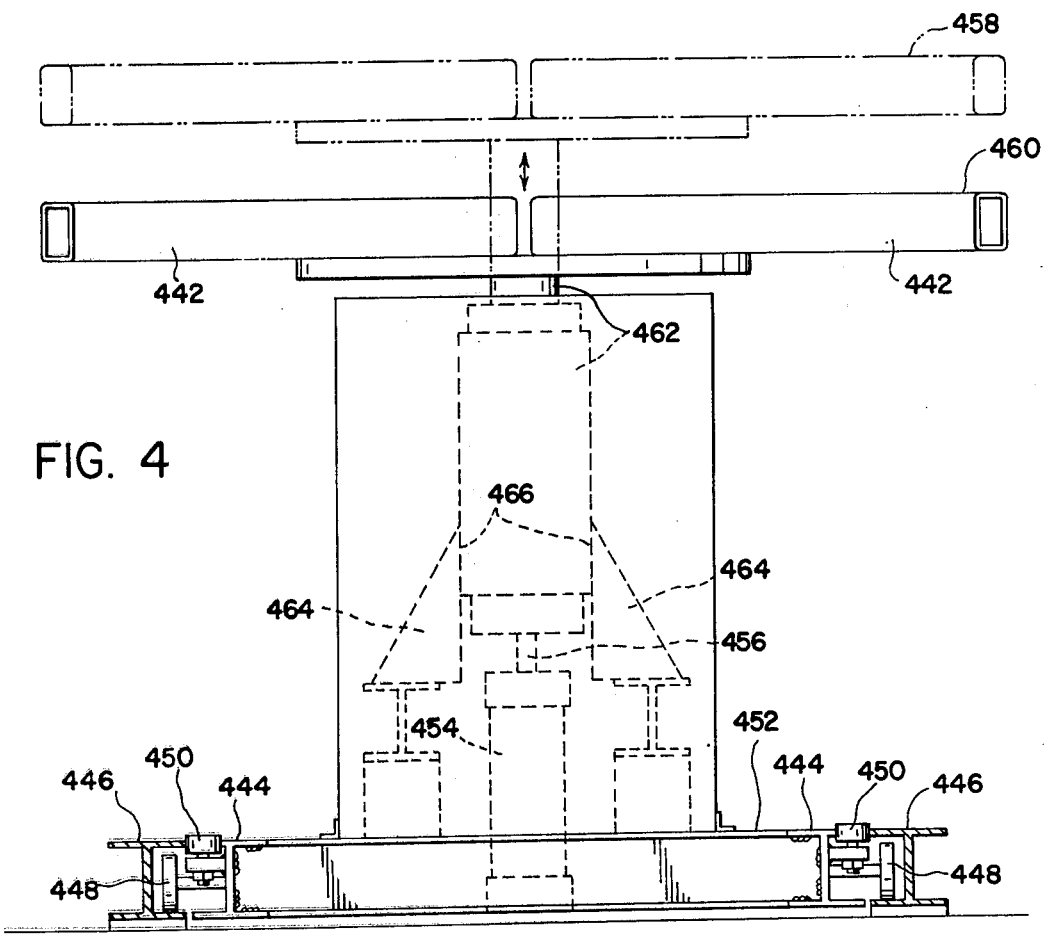
FIG. 4 is a side elevational view of the turntable device shown in FIG. 3.

The turntable device 14 has power conveyors 440, as shown in FIG. 4, which are of similar construction to the power conveyors 78 and 90 of the welding apparatus 10 described hereinabove. The power conveyors 440 include drive means 445 for moving the belts of the power conveyors 440 and are interconnected by the drive shaft 447. It should also be understood that the supporting surfaces of the power conveyors 440 are at the same level as the supporting surfaces of the removing power conveyors 90. When the door 16 is moved by the removing conveyor 90 towards the turntable device 14, the power conveyors 440 receive the door 16 thereon and move the door 16 away from the welding apparatus 10 until it is positioned over the arms 442 located on the base 444. At this point, the power conveyors 440 are stopped and the arms 442 are moved upwardly into contact with the door 16 supported by the power conveyors 440.

The base 444 includes cross channel members 446, as seen in FIGS. 1 and 4, which are generally of an "I beam" shape known to those skilled in the art. The cross channel members 446 are supported by the floor on which the apparatus 14 is mounted. Support rollers 448 are secured to the base frame 452 and roll on the I beams 446. The rollers 448 allow the base 444 to move laterally with respect to the welding apparatus 12 for purposes which will be hereinafter described. The guide rollers 450 are secured to the base frame 452 to guide the base 444 as it is moved in a lateral direction along the I beams 446.

To provide for vertical movement of the arms 442, the turntable device 14 also includes a fluid cylinder 454 which is secured to the base frame 452. The fluid cylinder 454 is of any conventional design well known to those skilled in the art. The cylinder 454 has a piston rod 456 which is movable in a vertical direction upon supplying pressurized fluid to one side or the other of the fluid cylinder 454 in a known manner.

The cylinder 454 is capable of raising the arms 442 between a raised position 458 and a lowered position 460, indicated in FIG. 4. A shaft 462 is provided to interconnect the piston rod 456 to the arms 442. Guide members 464 are provided with bearing surfaces 466 slidably interconnecting guide members 464 with the shaft 462 to allow movement of the shaft 462.

When the door 16 is supported by the power conveyors 440 after it is received from the welding apparatus 10, it is desirable to rotate the door 16, shown in outline form in FIG. 3, 90°. To effect such a 90° rotation, the arms 442 are raised by providing pressurized fluid to the cylinder 454 which in turn raise the arms 442 from the lowered position 460 to the raised position 458. When the arms 442 are so raised, the door 16 is lifted free of the conveyor 440 and is free to rotate about the axis of the shaft 462. An operator then manually rotates the door in a counterclockwise direction, indicated by the arrow 468, until the door 16 is rotated 90°.

To lower the door back onto the power conveyors 440, fluid pressure is released from the fluid cylinder 454 and the weight of the door 16 moves the arms to the retracted position 460. If it is desirable, pressurized fluid may be supplied to the cylinder 454 to move it to its lowered position 460. In the lowered position 460, the arms 442 are clear of the door 16 and the door 16 is free to be moved by the conveyors 440.

To load the partially welded door 16 onto the welding apparatus 12, the power conveyors 440 are then activated so that partially welded door 16 is moved toward the welding apparatus 12. The partially welded door 16 is thereby moved onto the welding apparatus 12 until the door 16 is in the loading position 185 indicated in FIG. 1. When the door 16 is in the loading position 185, it is secured to the carriage 70 of the welding apparatus 12 as hereinabove described in connection with welding apparatus 10. The door 16 is then welded by the welding apparatus 12 in the locations shown in FIG. 11 and indicated by a small circle thereon. Upon completion of the welds performed by the welding apparatus 12, the door 16 is in the unloading position on the welding apparatus 12 and is completely assembled.

It should be understood that the welding apparatuses 10 and 12 are of identical construction and operation, except that one of the welding units 76 on the welding apparatus 12 has been removed. It should be understood that such a welding head may remain on the welding apparatus 12 and simply rendered inoperative as hereinabove described.

I claim:

1. A method of welding workpieces to provide a structure having a plurality of areas with joined and bonded locations with at least one of said areas being different in depth than the depth of one of its adjacent areas, which method includes the combination of steps of:

providing at least one group of arc welding heads in a predetermined spatial arrangement;

moving said workpieces under said one group of heads;

stopping said workpieces in a position of orientation such that a first zone on the workpieces which includes portions of more than one of said areas different in depth are under said one group of heads;

lowering of said one group of heads until they come into contact with and exert pressure on said workpieces adjacent locations to be welded in the areas different in depth in said first zone;

activating said one group of welding heads to weld said workpieces at said locations to be welded in said first zone including providing a flow of shielding gas at said locations to be welded; and, feeding welding wire towards said locations to be welded and substantially simultaneously activating a power supply and an arc igniting welding current so that a welding arc is ignited between the workpieces and the welding wire;

sensing the ignition of said welding arc;

adjusting the speed of feeding the welding wire and the magnitude of the welding current to provide a more uniform weld;

stopping the feeding of welding wire;

burning back the welding wire until a welding arc no longer exists;

turning off the welding power supply;

stopping the flow of the shielding gas; and, lifting said one group of welding heads.

2. An apparatus for welding workpieces to provide a structure having a plurality of areas with joined and bonded locations with at least one of said areas being different in depth than the depth of one of its adjacent areas which apparatus includes in combination:

at least one group of welding heads in a predetermined spatial arrangement;

means for moving said workpieces under said one group of heads;

means for stopping said workpieces in a position of orientation such that a first zone on the workpieces which includes portions of more than one of said areas different in depth are under said one group of heads;

means for lowering of said one group of heads until they come into contact with and exert pressure on said workpieces adjacent locations to be welded in the areas different in depth in said first zone;

means for activating said one group of welding heads to weld said workpieces at said locations to be welded in said first zone including means for providing a flow of shielding gas at said locations to be welded; and, means for feeding welding wire towards said locations to be welded and substantially simultaneously activating a power supply and an arc igniting welding current so that a welding arc is ignited between the workpieces and the welding wire;

means for sensing the ignition of said welding arc;

means for adjusting the speed of feeding the welding wire and the magnitude of the welding current to provide a more uniform weld;

means for stopping the feeding of welding wire;

means for burning back the welding wire until a welding arc no longer exists;

means for turning off the welding power supply; and, means for stopping the flow of the shielding gas; and in combination, means for lifting said one group of welding heads.

* * * * *